US011310475B2

(12) United States Patent
Zhang et al.

(10) Patent No.: US 11,310,475 B2
(45) Date of Patent: Apr. 19, 2022

(54) VIDEO QUALITY DETERMINATION SYSTEM AND METHOD

(71) Applicant: City University of Hong Kong, Kowloon (HK)

(72) Inventors: Yun Zhang, Shenzhen (CN); Tak Wu Sam Kwong, Quarry Bay (HK)

(73) Assignee: City University of Hong Kong, Kowloon (HK)

( * ) Notice: Subject to any disclaimer, the term of this patent is extended or adjusted under 35 U.S.C. 154(b) by 118 days.

(21) Appl. No.: 16/531,281

(22) Filed: Aug. 5, 2019

(65) Prior Publication Data
US 2021/0044791 A1    Feb. 11, 2021

(51) Int. Cl.
| | | |
|---|---|---|
| H04N 13/144 | (2018.01) | |
| H04N 17/00 | (2006.01) | |
| G06T 7/50 | (2017.01) | |
| G06T 7/00 | (2017.01) | |
| G06T 7/13 | (2017.01) | |

(52) U.S. Cl.
CPC ......... *H04N 13/144* (2018.05); *G06T 7/0002* (2013.01); *G06T 7/13* (2017.01); *G06T 7/50* (2017.01); *G06T 7/97* (2017.01); *H04N 17/004* (2013.01); *G06T 2207/10016* (2013.01); *G06T 2207/30168* (2013.01)

(58) Field of Classification Search
None
See application file for complete search history.

(56) References Cited

U.S. PATENT DOCUMENTS

| | | | | |
|---|---|---|---|---|
| 6,075,561 A | * | 6/2000 | Janko | H04N 17/004 348/192 |
| 6,285,797 B1 | * | 9/2001 | Lubin | H04N 17/004 382/254 |
| 6,898,327 B1 | * | 5/2005 | Hrusecky | H04N 7/0132 348/606 |
| 9,686,526 B2 | * | 6/2017 | Pettersson | H04N 13/15 |
| 9,836,843 B2 | * | 12/2017 | Yu | H04N 17/00 |
| 10,049,502 B2 | * | 8/2018 | Grangetto | G06T 19/20 |
| 10,085,015 B1 | * | 9/2018 | Westwater | G06T 7/0002 |
| 10,127,646 B2 | * | 11/2018 | Oh | G06T 7/0002 |

(Continued)

FOREIGN PATENT DOCUMENTS

| | | |
|---|---|---|
| CN | 106341677 | 1/2017 |
| WO | 2012009695 | 1/2012 |

OTHER PUBLICATIONS

X. Liu, et al., "Subjective and objective video quality assessment of 3D synthesized views with texture/depth compression distortion", IEEE Transactions on Image Processing; vol. 24, No. 12, pp. 4847-4861, Dec. 2015.

(Continued)

*Primary Examiner* — Ricky Chin
(74) *Attorney, Agent, or Firm* — Renner Kenner Greive Bobak Taylor & Weber

(57) ABSTRACT

A computer-implemented method and related system for determining a quality of a synthesized video file. The method includes processing a reference video file and a synthesized video file associated with the reference video file to compare the original video file and the synthesized video file. The method also includes determining an extent of flicker distortion of the synthesized video file based on the processing.

24 Claims, 18 Drawing Sheets

(56) References Cited

U.S. PATENT DOCUMENTS

| | | | | |
|---|---|---|---|---|
| 10,165,281 | B2* | 12/2018 | Wang | G06V 20/40 |
| 10,186,297 | B2* | 1/2019 | Kolarov | G06V 10/42 |
| 2007/0230785 | A1* | 10/2007 | Watanabe | G06T 7/246 |
| | | | | 382/181 |
| 2008/0050032 | A1* | 2/2008 | Okuno | G06T 5/003 |
| | | | | 382/266 |
| 2008/0198920 | A1* | 8/2008 | Yang | H04N 19/172 |
| | | | | 375/E7.157 |
| 2009/0161983 | A1* | 6/2009 | Ciurea | G06T 5/003 |
| | | | | 382/275 |
| 2010/0002767 | A1* | 1/2010 | Fujibayashi | H04N 19/105 |
| | | | | 375/E7.243 |
| 2011/0255589 | A1* | 10/2011 | Saunders | H04N 19/176 |
| | | | | 375/E7.026 |
| 2011/0255597 | A1* | 10/2011 | Mihara | H04N 19/61 |
| | | | | 375/E7.243 |
| 2013/0003846 | A1* | 1/2013 | Price | H04N 19/105 |
| | | | | 375/E7.125 |
| 2015/0030084 | A1* | 1/2015 | Marchya | H04N 17/004 |
| | | | | 375/240.26 |
| 2015/0091899 | A1* | 4/2015 | Grangetto | H04N 13/111 |
| | | | | 345/419 |
| 2015/0110204 | A1* | 4/2015 | Sun | H04N 19/14 |
| | | | | 375/240.26 |
| 2015/0256857 | A1* | 9/2015 | Joshi | H04N 19/176 |
| | | | | 375/240.02 |
| 2016/0205397 | A1* | 7/2016 | Martin | H04N 17/04 |
| | | | | 348/192 |
| 2017/0154415 | A1* | 6/2017 | Aydin | H04N 17/004 |
| 2017/0372467 | A1* | 12/2017 | Carmel | G06V 10/44 |
| 2018/0068195 | A1* | 3/2018 | Kolarov | G06T 7/0002 |
| 2019/0058823 | A1* | 2/2019 | Dewhurst | H04N 5/2357 |
| 2020/0120324 | A1* | 4/2020 | Kwong | G06T 5/006 |
| 2020/0175668 | A1* | 6/2020 | Jeong | H04N 17/004 |
| 2021/0044791 | A1* | 2/2021 | Zhang | G06T 7/97 |

OTHER PUBLICATIONS

L. Li et al., "Quality assessment of DIBR-synthesized images by measuring local geometric distortions and global sharpness," IEEE Trans. Multimedia, vol. 20, No. 4, pp. 914-926, Apr. 2018.

F. Shao, et al., "Full-reference quality assessment of stereoscopic images by learning binocular receptive field properties," IEEE Transactions on Image Processing; vol. 24, No. 10, pp. 2971-2983, Oct. 2015.

F. Shao et al., "No-Reference view synthesis quality prediction for 3D videos based on color-depth interactions," IEEE Trans. Multimedia, vol. 20, No. 3, pp. 659-674, Mar. 2018.

* cited by examiner

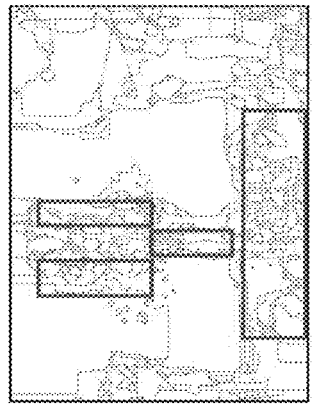
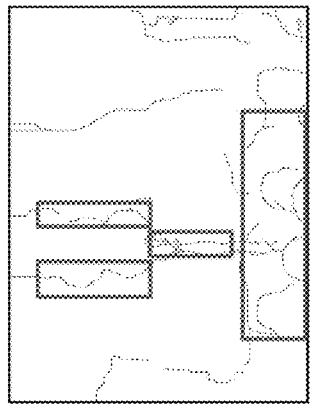
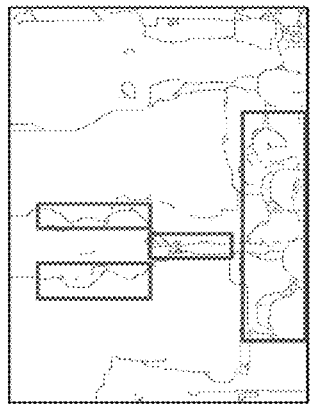
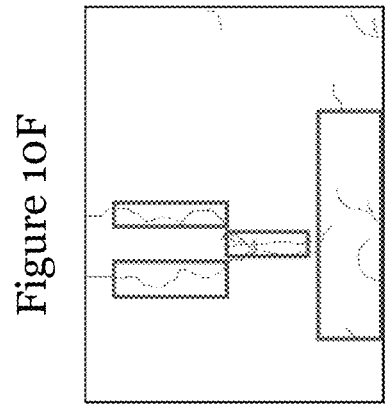
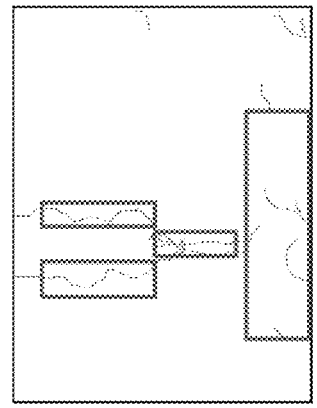
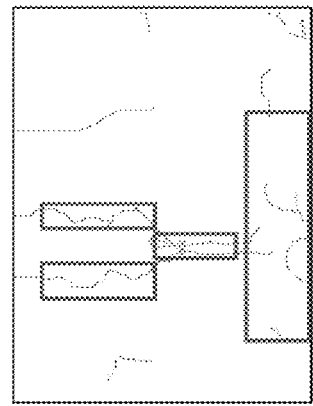
Figure 10A
Figure 10B
Figure 10C
Figure 10D
Figure 10E
Figure 10F
Figure 10G
Figure 10H
Figure 10I

| Training Sequences | Resolution | Frame Length | Extracted Layer Index |
|---|---|---|---|
| BasketballDrive | 1920×1080 | 300 | 216,432,648,864 |
| FourPeople | 1280×720 | 300 | 144,288,432,576 |
| Flowervase | 832×480 | 300 | 96,192,288,384 |
| Johnny | 1280×720 | 300 | 144,288,432,576 |
| KristenAndSara | 1280×720 | 300 | 144,288,432,576 |
| ParkScene | 1280×720 | 240 | 144,288,432,576 |
| RaceHorses | 416×240 | 300 | 48,96,144,192 |
| Vidyo3 | 1280×720 | 300 | 144,288,432,576 |

Figure 13

| Methods | UTCO | | | CTUD | | | CTCD | | | ALL Data | | |
|---|---|---|---|---|---|---|---|---|---|---|---|---|
| | PLCC | SROCC | RMSE | PLCC | SROCC | RMSE | PLCC | SROCC | RMSE | PLCC | SROCC | RMSE |
| PSNR | 0.545 | 0.481 | 0.093 | 0.569 | 0.566 | 0.109 | 0.658 | 0.666 | 0.085 | 0.645 | 0.627 | 0.098 |
| SSIM | 0.576 | 0.465 | 0.102 | 0.533 | 0.534 | 0.112 | 0.708 | 0.704 | 0.079 | 0.629 | 0.598 | 0.100 |
| WSNR | 0.316 | 0.295 | 0.105 | 0.770 | 0.778 | 0.085 | 0.610 | 0.645 | 0.089 | 0.605 | 0.589 | 0.102 |
| MSSSIM | 0.799 | 0.626 | 0.078 | 0.714 | 0.718 | 0.093 | 0.843 | 0.849 | 0.080 | 0.743 | 0.731 | 0.086 |
| IW-PSNR | 0.514 | 0.458 | 0.095 | 0.711 | 0.723 | 0.093 | 0.686 | 0.671 | 0.082 | 0.686 | 0.663 | 0.093 |
| IW-SSIM | 0.751 | 0.741 | 0.073 | 0.811 | 0.811 | 0.078 | 0.868 | 0.863 | 0.056 | 0.795 | 0.792 | 0.078 |
| VQM | 0.608 | 0.527 | 0.088 | 0.753 | 0.755 | 0.087 | 0.632 | 0.643 | 0.087 | 0.671 | 0.655 | 0.095 |
| MOVIE | 0.603 | 0.573 | 0.088 | 0.655 | 0.649 | 0.100 | 0.703 | 0.713 | 0.080 | 0.710 | 0.693 | 0.090 |
| Base | 0.317 | 0.293 | 0.105 | 0.385 | 0.376 | 0.122 | 0.535 | 0.489 | 0.095 | 0.461 | 0.431 | 0.114 |
| MP-PSNR | 0.576 | 0.490 | 0.090 | 0.508 | 0.496 | 0.1142 | 0.595 | 0.598 | 0.090 | 0.601 | 0.587 | 0.103 |
| MP-PSNRr | 0.560 | 0.523 | 0.092 | 0.489 | 0.485 | 0.116 | 0.543 | 0.547 | 0.094 | 0.589 | 0.581 | 0.104 |
| MW-PSNR | 0.570 | 0.501 | 0.091 | 0.466 | 0.480 | 0.117 | 0.555 | 0.568 | 0.094 | 0.580 | 0.569 | 0.105 |
| MW-PSNRr | 0.569 | 0.520 | 0.091 | 0.458 | 0.451 | 0.118 | 0.548 | 0.565 | 0.094 | 0.575 | 0.569 | 0.105 |
| 3DSwIM | 0.322 | 0.266 | 0.105 | 0.105 | 0.193 | 0.132 | 0.382 | 0.243 | 0.104 | 0.386 | 0.268 | 0.118 |
| LOGS | 0.656 | 0.625 | 0.083 | 0.511 | 0.523 | 0.114 | 0.571 | 0.550 | 0.092 | 0.641 | 0.570 | 0.099 |
| PSPTNR | 0.487 | 0.527 | 0.086 | 0.339 | 0.391 | 0.125 | 0.353 | 0.338 | 0.105 | 0.433 | 0.453 | 0.116 |
| Liu | 0.824 | 0.824 | 0.063 | 0.843 | 0.838 | 0.071 | 0.868 | 0.863 | 0.056 | 0.868 | 0.869 | 0.064 |
| FDI | — | — | — | — | — | — | — | — | — | 0.595 | 0.570 | 0.103 |
| SR-3DVQA | 0.916 | 0.886 | 0.044 | 0.909 | 0.920 | 0.055 | 0.894 | 0.888 | 0.051 | 0.910 | 0.914 | 0.053 |

Figure 14

| Methods | $U_T C_D$ $R_{i,j}$/sig. | $C_T U_D$ $R_{i,j}$/sig. | $C_T C_D$ $R_{i,j}$/sig. | ALL $R_{i,j}$/sig. |
|---|---|---|---|---|
| PSNR | 4.4000/1 | 3.9355/1 | 2.8077/1 | 3.3448/1 |
| SSIM | 5.3000/1 | 4.1613/1 | 2.4615/1 | 3.4483/1 |
| WSNR | 5.6500/1 | 2.3548/1 | 3.1154/1 | 3.6207/1 |
| MSSSIM | 3.1000/1 | 2.8387/1 | 1.4231/0 | 2.5517/1 |
| IW-PSNR | 4.6000/1 | 2.8710/1 | 2.6154/1 | 3.0345/1 |
| IW-SSIM | 2.7000/1 | 2.0000/1 | 1.2308/0 | 2.1034/1 |
| VQM | 3.9500/1 | 2.5161/1 | 2.9615/1 | 3.1379/1 |
| MOVIE | 4.0000/1 | 3.3226/1 | 2.5000/1 | 2.8276/1 |
| Bose | 5.6000/1 | 4.9677/1 | 3.5385/1 | 4.5172/1 |
| MP-PSNR | 4.2000/1 | 4.3226/1 | 3.1923/1 | 3.6552/1 |
| MP-PSNRr | 4.3000/1 | 4.4194/1 | 3.5000/1 | 3.7241/1 |
| MW-PSNR | 4.2000/1 | 4.5484/1 | 3.4231/1 | 3.7931/1 |
| MW-PSNRr | 4.2500/1 | 4.5806/1 | 3.4615/1 | 3.8276/1 |
| 3DSwIM | 5.6000/1 | 5.7419/1 | 4.2308/1 | 4.8621/1 |
| LOGS | 3.5500/1 | 4.2903/1 | 3.3462/1 | 3.3793/1 |
| PSPTNR | 4.7500/1 | 5.1613/1 | 4.3462/1 | 4.6552/1 |
| Liu | 2.0000/1 | 1.6774/0 | 1.2308/0 | 1.4138/1 |
| F-ratio threshold | 1.6927 | 1.6927 | 1.5994 | 1.3217 |

Figure 15

| Pooling methods | $(w_1, w_2)$ | PLCC | SROCC | RMSE |
|---|---|---|---|---|
| Summation $(c, d)=(1, 0)$ | (0.5,0.5) | 0.910 | 0.914 | 0.053 |
| | (0.6,0.4) | 0.900 | 0.905 | 0.056 |
| | (0.8,0.2) | 0.851 | 0.852 | 0.067 |
| | (0.4,0.6) | 0.907 | 0.908 | 0.054 |
| | (0.2,0.8) | 0.862 | 0.862 | 0.065 |
| Pooling methods | $f(\cdot)$ | PLCC | SROCC | RMSE |
| Multiplication $(c, d)=(0, 1)$ | $f(x) = x$ | 0.889 | 0.889 | 0.059 |
| | 'log10' | 0.880 | 0.879 | 0.061 |
| | 'log2' | 0.880 | 0.879 | 0.061 |
| | 'cubic' | 0.896 | 0.899 | 0.057 |
| | 'square' | 0.904 | 0.906 | 0.055 |
| | 'square root' | 0.853 | 0.846 | 0.067 |
| Pooling methods | $(c, d)$ | PLCC | SROCC | RMSE |
| Combination $(w_1, w_2)=(0.5, 0.5)$ $f(\cdot)=$ 'square' | (0.5,0.5) | 0.909 | 0.913 | 0.053 |
| | (0.6,0.4) | 0.910 | 0.913 | 0.053 |
| | (0.8,0.2) | 0.910 | 0.914 | 0.053 |
| | (0.4,0.6) | 0.909 | 0.912 | 0.053 |
| | (0.2,0.8) | 0.908 | 0.911 | 0.054 |

Figure 16

| Datasets | Synthesized Depth Video | | | Original Depth Video | | |
|---|---|---|---|---|---|---|
| | PLCC | SROCC | RMSE | PLCC | SROCC | RMSE |
| $U_T C_D$* | 0.925 | 0.893 | 0.043 | 0.916 | 0.887 | 0.045 |
| $C_T U_D$* | 0.908 | 0.914 | 0.060 | 0.909 | 0.920 | 0.059 |
| $C_T C_D$* | 0.923 | 0.921 | 0.052 | 0.921 | 0.915 | 0.053 |
| ALL Data* | 0.913 | 0.914 | 0.054 | 0.908 | 0.908 | 0.056 |

Figure 17

VIDEO QUALITY DETERMINATION SYSTEM AND METHOD

TECHNICAL FIELD

The invention relates to a video quality determination method, and a related system implementing the method.

BACKGROUND

Three-Dimensional (3D) and virtual reality (VR) video are becoming increasingly popular because it can provide real depth perception, immersive vision, and novel visual enjoyment for multimedia applications, such as in omnidirectional videos, 3D Free-viewpoint Television, 3D Television broadcasting, immersive teleconference, 3DoF and 6DoF VR.

Objective virtual viewpoint image (VVI) quality metrics for quantifying and determining (e.g., predicting) the quality of these videos is highly desirable. This is because based on these metrics, visual processing techniques, e.g., such as image/video compression, digital watermarking, and image/video reconstruction in 3D video system can then be optimized accordingly to improve the quality of experience of 3D or VR systems.

Conventional 2D quality metrics, such as the well-known Mean Squared Error (MSE) or Peak Signal-to-Noise Ratio (PSNR), are relatively simple and are commonly used in measuring the quality of image and video applications. However, these metrics are based on pixel-wise difference between the distorted images and the source images, which could not properly reflect the real perceptual quality of visual signal (video). In addition, these metrics are not based on human perception of the visual signal (video).

SUMMARY OF THE INVENTION

It is an object of the invention to address the above needs, to overcome or substantially ameliorate the above disadvantages or, more generally, to provide an improved system and method for determining a quality of a synthesized video file such as a synthesized view video file of 3D or VR video system.

In accordance with a first aspect of the invention, there is provided a computer-implemented method for determining a quality of a synthesized video file. The method including: processing a reference video file and a synthesized video file associated with the reference video file to compare the reference video file and the synthesized video file; and determining an extent of flicker distortion of the synthesized video file based on the processing. The synthesized video file may be a 3D video file containing 3D video data, or it may be a virtual reality video file containing virtual reality video data.

In one embodiment of the first aspect, the synthesized video at virtual viewpoint is rendered from the colour videos and depth videos of the neighboring real viewpoints, e.g., by using Depth Image based Rendering (DIBR). For example, the synthesized videos can be rendered from distorted colour/depth videos from neighboring real views (left and right) in the practical applications. Preferably, the synthesized video file is created by processing the video file containing the video at the real viewpoints.

Preferably, determining an extent of flicker distortion of the synthesized video file based on the comparison includes: determining respective extents of flicker distortion for each temporal frame of the synthesized video file; and determining an overall extent of flicker distortion of the synthesized video file based on the respective extents of flicker distortion.

Preferably, determining an extent of flicker distortion of the synthesized video file based on the comparison further includes: weighting the respective extents of flicker distortion for each temporal frame of the synthesized video file to determine the overall extent of flicker distortion.

Preferably, processing the reference video file and the synthesized video file includes: segmenting the reference video file into a plurality of temporal layers; segmenting the synthesized video file into a plurality of temporal layers; and processing the temporal layers of the reference video file and the temporal layers of the synthesized video file to identify flicker distortion in the synthesized video file.

Preferably, processing the temporal layers of the reference video file and the temporal layers of the synthesized video file includes: processing the temporal layers of the reference video file to determine temporal gradient layers associated with the temporal layers of the reference video file; and/or processing the temporal layers of the synthesized video file to determine temporal gradient layers associated with the temporal layers of the synthesized video file.

Preferably, processing the temporal layers of the reference video file and the temporal layers of the synthesized video file further includes: filtering the temporal gradient layers of the reference video file to remove gradient features with values below a threshold; and filtering the temporal gradient layers of the synthesized video file to remove gradient features with values below a threshold.

Preferably, processing the reference video file and the synthesized video file further includes: processing a reference depth video file associated with the reference video file for facilitating comparison of the reference video file and the synthesized video file.

In one example, in the 3D and VR applications, there are multiple views of colour videos and corresponding depth videos to represent the 3D video. This is denoted as "multi-view video plus depth (MVD)". In these cases, the depth video file (or reference depth video file) is part of the 3D video file.

Preferably, processing the reference depth video file includes: processing the reference depth video file to detect edges of the reference depth video file to generate a depth edge video file; and segmenting the depth edge video file into a plurality of temporal depth layers.

Preferably, processing the reference depth video file further includes: processing the temporal depth layers to expand the detected edge width in the temporal depth layers.

Preferably, processing the reference video file and the synthesized video file further includes: processing the temporal gradient layers of the reference video file based on the temporal depth layers to obtain weighted temporal gradient layers associated with the reference video file; and processing the temporal gradient layers of the synthesized video file based on the temporal depth layers to obtain weighted temporal gradient layers associated with the synthesized video file.

Preferably, processing the reference video file and the synthesized video file further includes: processing the weighted temporal gradient layers associated with the original video file and the weighted temporal gradient layers associated with the synthesized video file using sparse representation processing techniques to determine flicker distortion in each of the weighted temporal gradient layers of the synthesized video file.

Preferably, processing the reference video file and the synthesized video file further includes: processing the weighted temporal gradient layers associated with the original video file and the weighted temporal gradient layers associated with the synthesized video file using sparse representation processing techniques to determine phase distortion and amplitude distortion associated with flicker distortion in each of the weighted temporal gradient layers of the synthesized video file.

Preferably, processing the reference video file and the synthesized video file further includes: weighting the phase distortion and the amplitude distortion respectively associated with flicker distortion in each of the weighted temporal gradient layers of the synthesized video file.

Preferably, the method further includes determining an extent of spatial-temporal activity distortion of the synthesized video file.

Preferably, determining an extent of spatial-temporal activity distortion of the synthesized video file includes: determining respective extents of spatial-temporal activity distortion for each temporal frame of the synthesized video file; and determining an overall extent of spatial-temporal activity distortion of the synthesized video file based on the respective extents of spatial-temporal activity distortion.

Preferably, determining an extent of spatial-temporal activity distortion of the synthesized video file further includes: weighting the respective extents of spatial-temporal activity distortion for each temporal frame of the synthesized video file to determine the overall extent of spatial-temporal activity distortion.

Preferably, the method further includes determining a quality of the synthesized video file based on the determined extent of flicker distortion and the determined extent of spatial-temporal activity distortion.

In accordance with a second aspect of the invention, there is provided a system for determining a quality of a synthesized video file. The system includes one or more processors arranged to perform any of the methods of the first aspect. In particular, the one or more processors are arranged to: process a reference video file and a synthesized video file associated with the reference video file to compare the reference video file and the synthesized video file; and determine an extent of flicker distortion of the synthesized video file based on the processing. The synthesized video file may be a 3D video file containing 3D video data, or it may be a virtual reality video file containing virtual reality video data.

Preferably, the system further includes a display operably connected with the one or more processors for displaying the determined extent of flicker distortion.

Preferably, the one or more processors are further arranged to: determine an extent of spatial-temporal activity distortion of the synthesized video file.

Preferably, the one or more processors are further arranged to: determine a quality of the synthesized video file based on the determined extent of flicker distortion and the determined extent of spatial-temporal activity distortion.

In accordance with a third aspect of the invention, there is provided a non-transitory computer readable medium for storing computer instructions that, when executed by one or more processors, causes the one or more processors to perform a method of the first aspect.

BRIEF DESCRIPTION OF THE DRAWINGS

Embodiments of the invention will now be described, by way of example, with reference to the accompanying drawings in which:

FIG. 10A is a video frame of a synthesized video entitled "Balloons"; FIG. 10B is a depth map of the video frame of FIG. 10A;

FIG. 10C is an edge map of the depth map of FIG. 10B with canny threshold 0.03;

25

Figure 8:
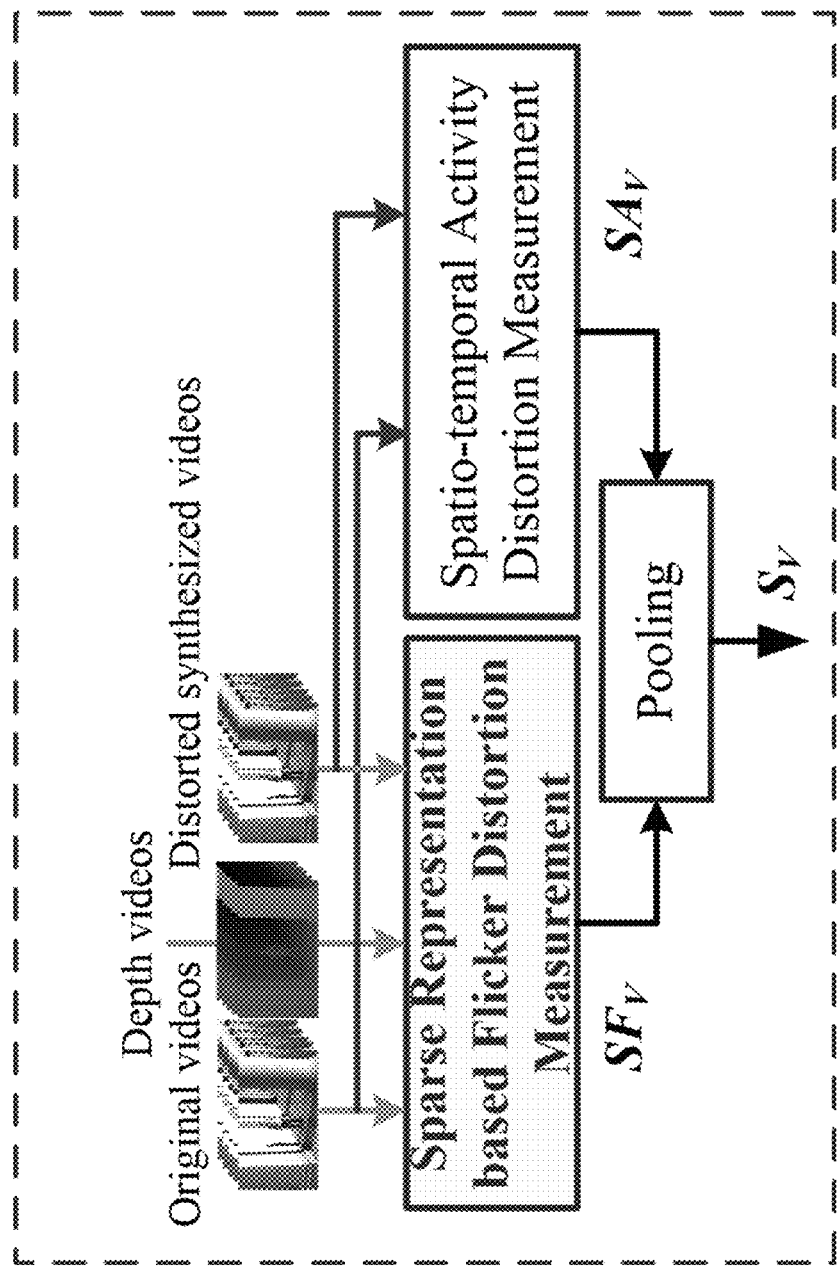
FIG. 8 is a schematic flowchart showing a sparse representation based 3D view quality assessment (SR-3DVQA) method in one embodiment of the invention.
Figure 11A:
Figure 11B:
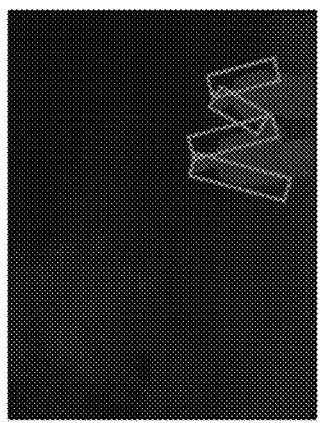
Figure 11C:
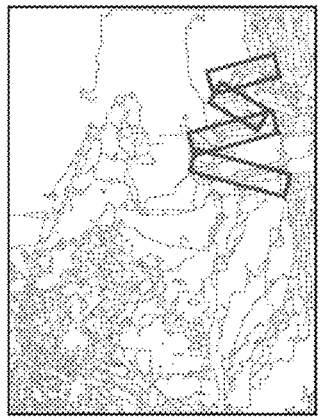
Figure 11D:
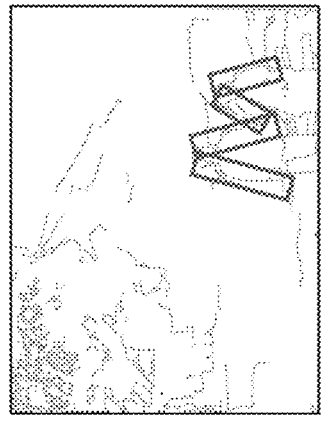
Figure 11E:
Figure 11F:
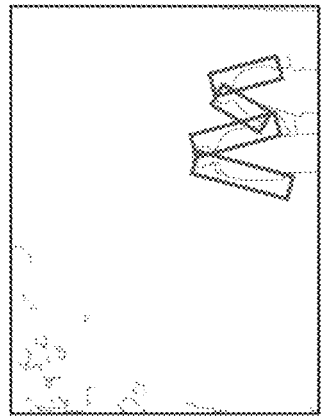
Figure 11G:
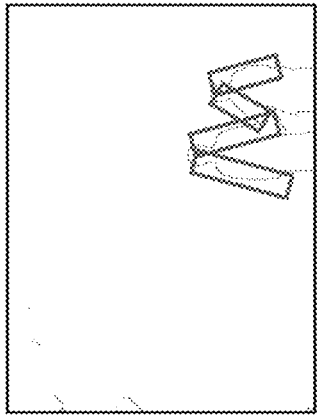
Figure 11H:
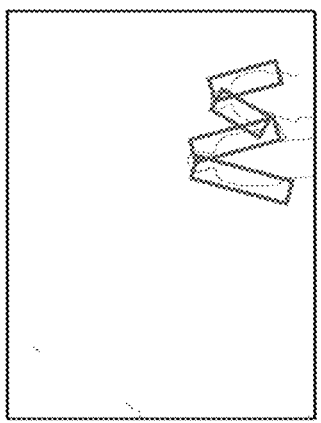
Figure 11I:
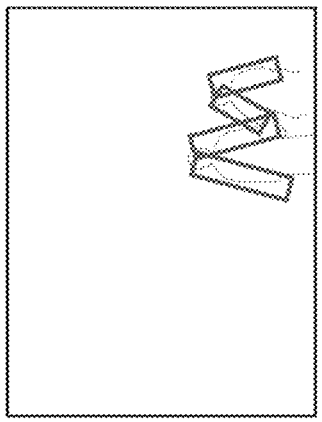
Figure 12C:
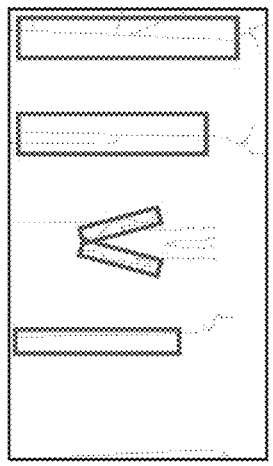
Figure 12F:
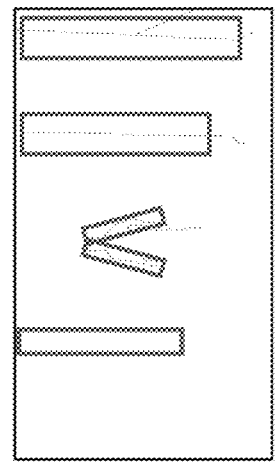
Figure 12I:
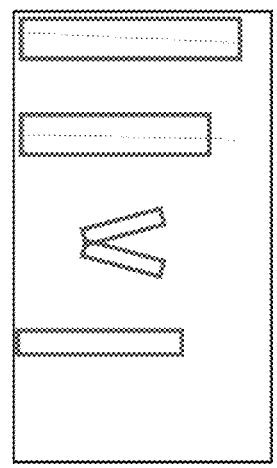
Figure 12B:
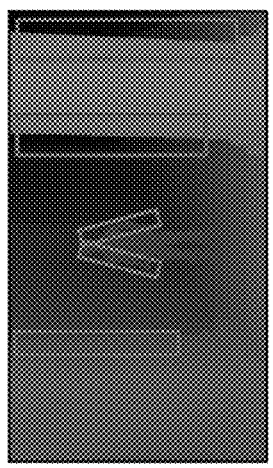
Figure 12E:
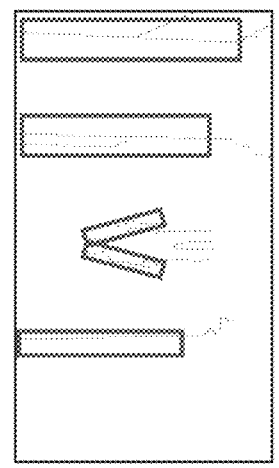
Figure 12H:
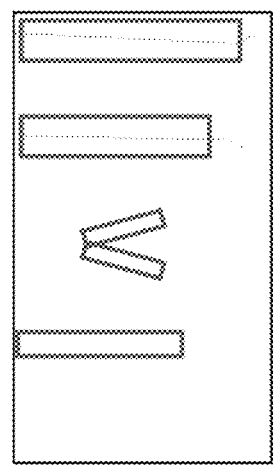
Figure 12A:
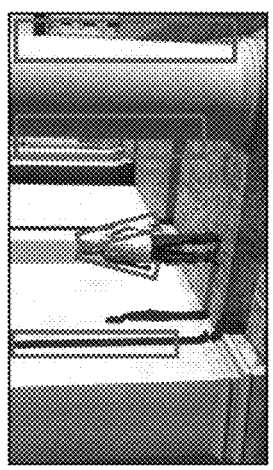
Figure 12D:
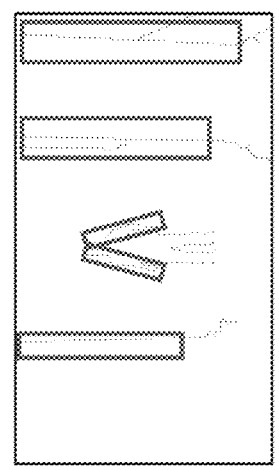
Figure 12G:
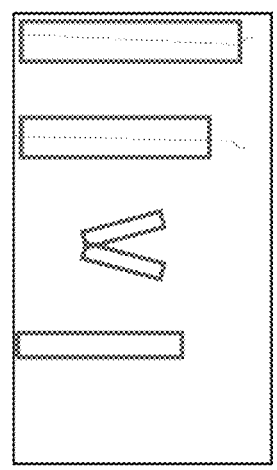
Figure 18:
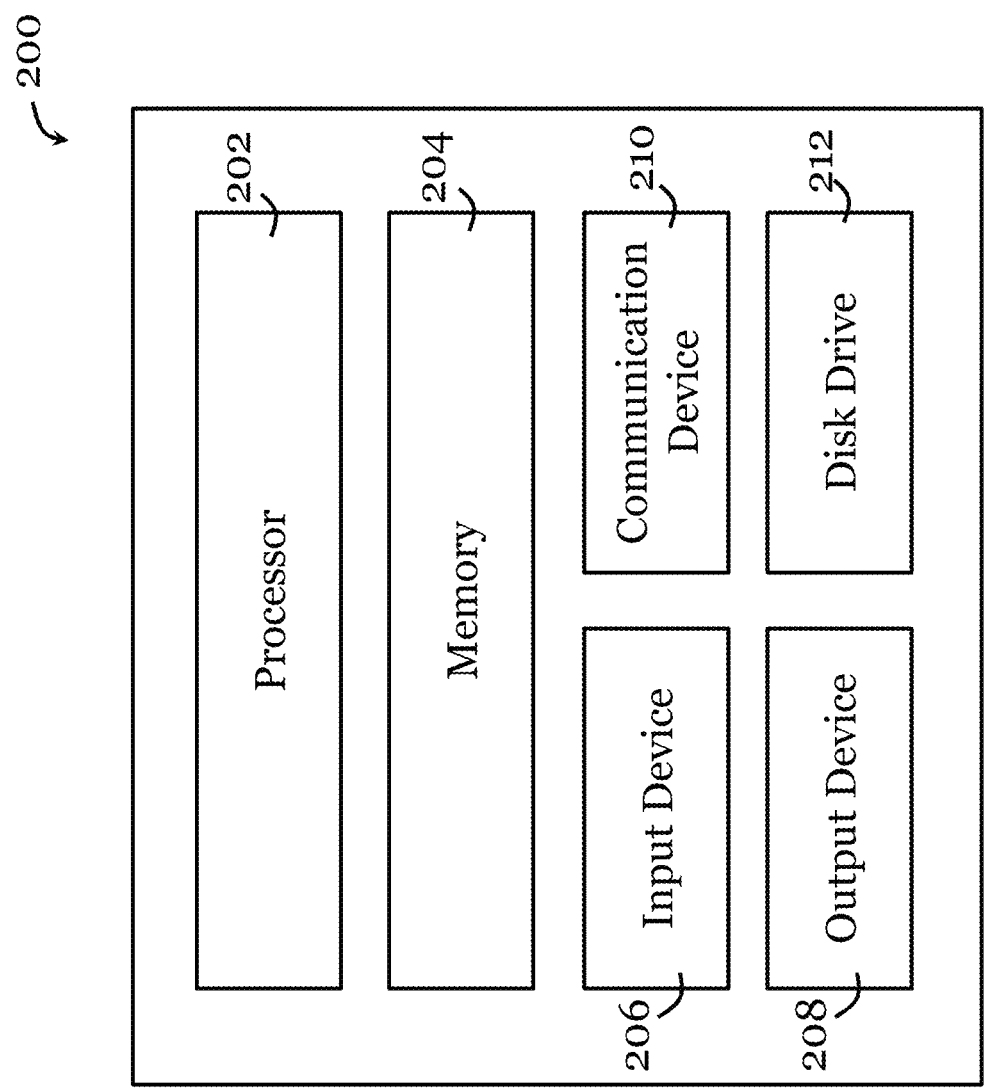

FIG. 10D is an edge map of the depth map of FIG. 10B with canny threshold 0.07;

FIG. 10E is an edge map of the depth map of FIG. 10B with canny threshold 0.1;

FIG. 10F is an edge map of the depth map of FIG. 10B with canny threshold 0.2;

FIG. 10G is an edge map of the depth map of FIG. 10B with canny threshold 0.3;

FIG. 10H is an edge map of the depth map of FIG. 10B with canny threshold 0.4;

FIG. 10I is an edge map of the depth map of FIG. 10B with canny threshold 0.5;

FIG. 11A is a video frame of a synthesized video entitled "Lovebirds";

FIG. 11B is a depth map of the video frame of FIG. 11A;

FIG. 11C is an edge map of the depth map of FIG. 11B with canny threshold 0.03;

FIG. 11D is an edge map of the depth map of FIG. 11B with canny threshold 0.07;

FIG. 11E is an edge map of the depth map of FIG. 11B with canny threshold 0.1;

FIG. 11F is an edge map of the depth map of FIG. 11B with canny threshold 0.2;

FIG. 11G is an edge map of the depth map of FIG. 11B with canny threshold 0.3;

FIG. 11H is an edge map of the depth map of FIG. 11B with canny threshold 0.4;

FIG. 11I is an edge map of the depth map of FIG. 11B with canny threshold 0.5;

FIG. 12A is a video frame of a synthesized video entitled "Undodancer";

FIG. 12B is a depth map of the video frame of FIG. 12A;

FIG. 12C is an edge map of the depth map of FIG. 12B with canny threshold 0.03;

FIG. 12D is an edge map of the depth map of FIG. 12B with canny threshold 0.07;

FIG. 12E is an edge map of the depth map of FIG. 12B with canny threshold 0.1;

FIG. 12F is an edge map of the depth map of FIG. 12B with canny threshold 0.2;

FIG. 12G is an edge map of the depth map of FIG. 12B with canny threshold 0.3;

FIG. 12H is an edge map of the depth map of FIG. 12B with canny threshold 0.4;

FIG. 12I is an edge map of the depth map of FIG. 12B with canny threshold 0.5;

FIG. 13 is a table showing properties of the training sequences for different sample videos entitled "BasketballDrive", "FourPeople", "Flowervase", "Johnny", "KristenAndSara", "ParkScene", "RaceHorses", and "Vidyo3";

FIG. 14 a table showing the performance comparison between existing benchmark methods and the SR-3DVQA method of FIG. 8 on the SIAT database, which includes three subsets $U_T C_D$, $C_T U_D$, $C_T C_D$, a combination of the three subsets (ALL dataset);

FIG. 15 is a table showing statistical significance test results including variance ratios between existing benchmark methods and the SR-3DVQA method of FIG. 8 on the four datasets;

FIG. 16 is a table showing performance metrics of the SR-3DVQA method (in particular the pooling methods of flicker distortion measurement and spatial-temporal activity distortion measurement) of FIG. 8;

FIG. 17 is a table showing performance metrics of the SR-3DVQA method (in particular the impacts from the reference depth video) of FIG. 8; and FIG. 18 is a block diagram of a system for determining a quality of a synthesized video file in one embodiment of the invention.

DETAILED DESCRIPTION OF THE PREFERRED EMBODIMENT

Temporal flicker distortion is one of the most annoying noises in synthesized virtual view videos when they are rendered by compressed multi-view video plus depth in 3D or VR video system. The inventors of the present application have realized the need of an objective video quality assessment which can accurately measure the flicker distortion to assess the synthesized view video quality and further optimize the compression techniques in 3D or VR video system is highly needed.

Figure 1:
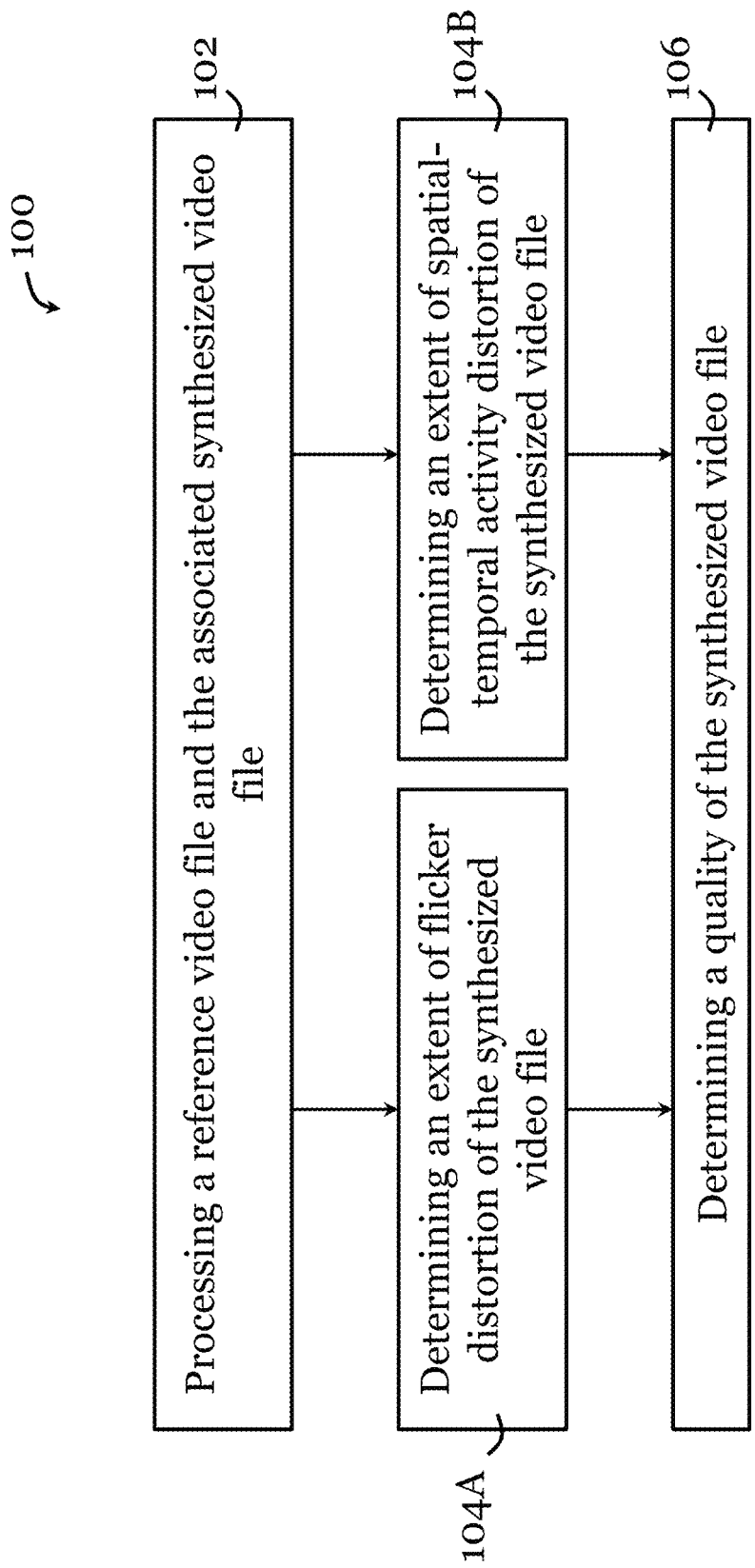
FIG. 1 is a block diagram of a method for determining a quality of a synthesized video file in one embodiment of the invention.

FIG. 1 shows a method 100 for determining a quality of a synthesized video file. The method includes, in step 102, processing a reference video file and a synthesized video file to compare the reference video file and the synthesized video file. Here the synthesized video file is associated with the reference video file. Then, in step 104A, an extent of flicker distortion of the processed video file is determined based on the processing. Additionally or alternatively, in step 104B, an extent of spatial-temporal activity distortion of the synthesized video file is determined based on the processing. Finally, in step 106, a quality of the synthesized video file is determined based on one or both of the extent of flicker distortion of the processed video file and the extent of spatial-temporal activity distortion of the synthesized video file. In this embodiment, the synthesized video file is a 3D video file containing 3D video data, or a virtual reality video file containing virtual reality video data.

In some embodiments, step 102 includes: segmenting the reference video file into a plurality of temporal layers; segmenting the synthesized video file into a plurality of temporal layers, and processing the temporal layers of the reference video file and the temporal layers of the synthesized video file to identify flicker distortion in the synthesized video file. Processing the temporal layers of the reference video file and the temporal layers of the synthesized video file may include: processing the temporal layers of the reference video file to determine temporal gradient layers associated with the temporal layers of the reference video file, and/or processing the temporal layers of the synthesized video file to determine temporal gradient layers associated with the temporal layers of the synthesized video file. Processing the temporal layers of the reference video file and the temporal layers of the synthesized video file may further include: filtering the temporal gradient layers of the reference video file to remove gradient features with values below a threshold; and filtering the temporal gradient layers of the synthesized video file to remove gradient features with values below a threshold. Step 102 may further include: processing a reference depth video file associated with the reference video file for facilitating comparison of the reference video file and the synthesized video file. Processing the reference depth video file may include: processing the reference depth video file to detect edges of the reference depth video file to generate a depth edge video file; and segmenting the depth edge video file into a plurality of temporal depth layers. Optionally, the temporal depth layers are processed to expand the detected edge width in the temporal depth layers. Step 102 may further include: processing the temporal gradient layers of the reference video file based on the temporal depth layers to obtain weighted temporal gradient layers associated with the reference video file; and processing the temporal gradient layers of the synthesized video file based on the temporal depth layers to obtain weighted temporal gradient layers associated with the synthesized video file. Step 102 may further include: processing the weighted temporal gradient layers associated with the reference video file and the weighted temporal gradient layers associated with the synthesized video file using sparse representation processing techniques to determine flicker distortion in each of the weighted temporal gradient layers of the synthesized video file. Step 102 may further include: further includes: processing the weighted temporal gradient layers associated with the reference video file and the weighted temporal gradient layers associated with the synthesized video file using sparse representation processing techniques to determine phase distortion and amplitude distortion associated with flicker distortion in each of the weighted temporal gradient layers of the synthesized video file. The phase distortion and the amplitude distortion respectively associated with flicker distortion may be weighted in each of the weighted temporal gradient layers of the synthesized video file.

In some embodiments, step 104A may include: determining respective extents of flicker distortion for each temporal frame of the synthesized video file, and determining an overall extent of flicker distortion of the synthesized video file based on the respective extents of flicker distortion. Optionally, the respective extents of flicker distortion for each temporal frame of the synthesized video file are weighted to determine the overall extent of flicker distortion.

In some embodiments, step 104B includes: determining respective extents of spatial-temporal activity distortion for each temporal frame of the synthesized video file; and determining an overall extent of spatial-temporal activity distortion of the synthesized video file based on the respective extents of spatial-temporal activity distortion. Optionally, the respective extents of spatial-temporal activity distortion for each temporal frame of the synthesized video file are weighted to determine the overall extent of spatial-temporal activity distortion.

One specific implementation of the method of FIG. 1 is presented below. Table I shows the definitions of key symbols or variables used in the following disclosure.

TABLE I

Definitions of Key Symbols or Variables

| Variables | Descriptions |
|---|---|
| $L_i$ | The i-th temporal layer of the video V |
| $\{L_i | 1 \leq i \leq H\}$ | Temporal layers set denotation of video V |
| $\{L_{o,i}\}, \{L_{d,i}\}$ | The original and distorted video $V_o$ and $V_d$ denoted by temporal layers set, respectively |
| V(x, y, t) | The pixel value (x, y, t) in video V |
| $V^g$(x, y, t) | The gradient value of pixel (x, y, t) in video V |
| $G_i$ | The i-th gradient temporal layer of the video V |
| $\{G_{o,i}\}, \{G_{d,i}\}$ | The original and distorted gradient video denoted by temporal layers set, respectively |
| $S_{V,i}$ | The effective patch index set in the i-th gradient temporal layer of video $V_o$ and $V_d$ |
| D(x, y, t), $D^{edge}$(x, y, t), $D^{edge'}$(x, y, t) | The pixel, edge, dilated edge pixel value of (x, y, t) of depth video D, respectively |
| $E_{o,k}, E'_{o,k}$ | The k-th edge frame, dilated edge frame of depth video D |
| $M_{o,i}$ | The i-th edge temporal layer in depth video D |
| $S_{E,i}$ | The effective patch index set in the i-th edge temporal layer of depth video D |
| $S_i$ | The flicker distortion area patch index set in the i-th temporal layer of video $V_o$ and $V_d$ |
| $y_{u,v}^{o,i}$, $y_{u,v}^{d,i}$ | The patch at (u, v) in the i-th temporal layer of video $V_o$ and $V_d$, respectively |
| w | The weight map of the temporal layer of a synthesized video |

For a synthesized view or video generated via depth-image-based rendering (DIBR) technology in Multiview Video plus Depth (MVD) based 3D video system, the rendering process usually consists of two steps. The first step is warping pixels from existing neighboring views to another new virtual view via DIBR. Due to dis-occlusion and rounding operations in warping, small holes may exist in the rendered image. The second step is hole filling and post-processing, namely inpainting the dis-occluded areas or holes from their surrounding pixels. However, due to imperfect depth images and misalignment between color and depth image, some distortions such as contour artifacts and geometrical distortions, may occur during the DIBR process. In addition, the compression distortion in color images will be transferred to the rendered images, while the depth distortions will induce the displacement of pixels, i.e., geometrical distortion. The inconsistency between temporally successive depth images caused by depth image generation and compression may also induce inconsistent geometrical distortions among frames (also known as temporal flicker distortion).

Figure 2A:
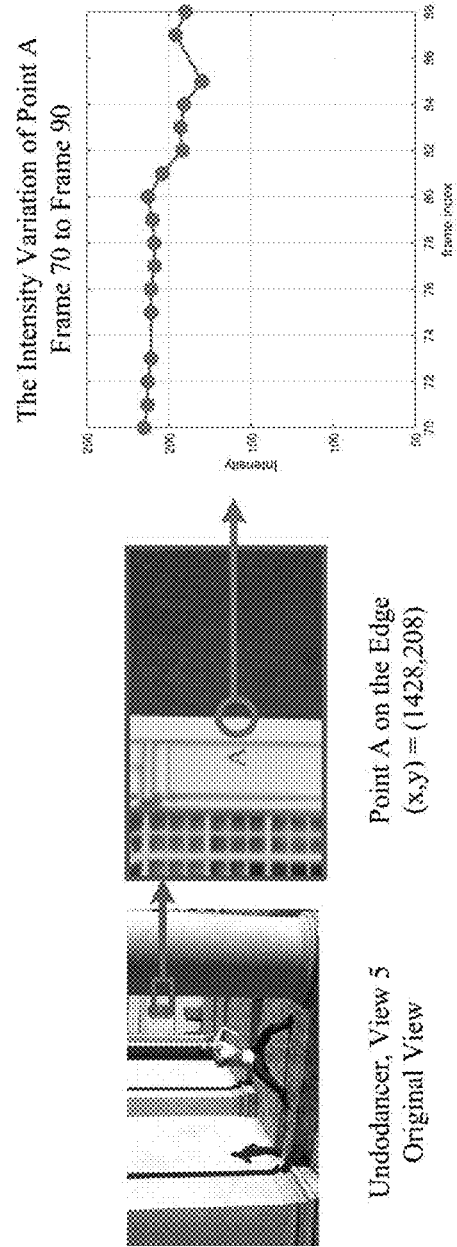
FIG. 2A shows a video frame in an original video entitled "Undodancer", its zoom-in view, and an intensity plot along the line in the video frame.
Figure 2B:
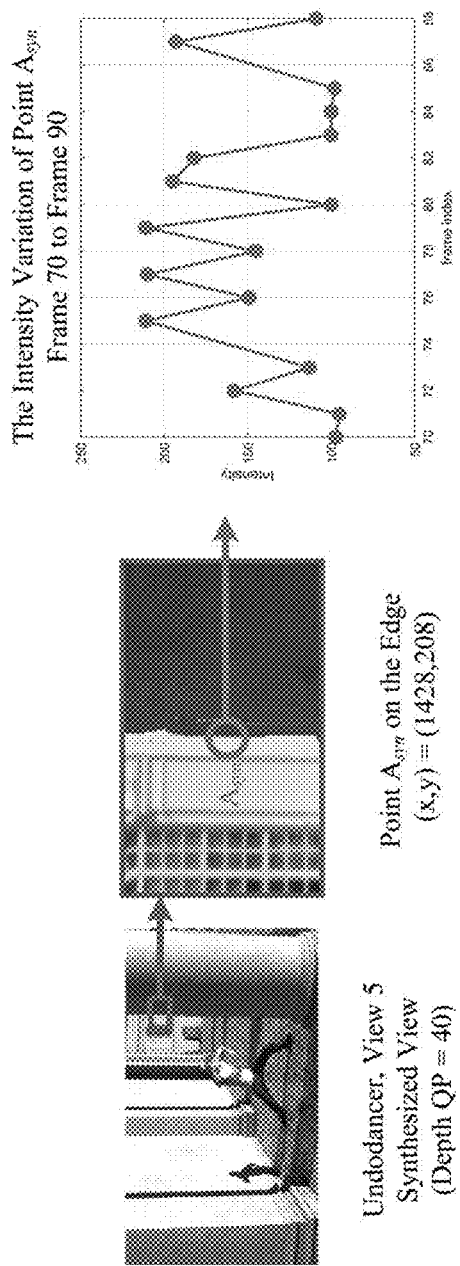
FIG. 2B shows a video frame in a synthesized video corresponding to the original video of FIG. 2A, its zoom-in view, and an intensity plot along the line in the video frame.

FIGS. 2A and 2B illustrate an example of the flicker distortion along the rim of a pillar in the synthesized video with depth compression distortion of Undodancer. It can be observed that the intensity of point A in the original view (FIG. 2A) changes little and relatively smoothly in the twenty frames. In contrast, the intensity of corresponding point in synthesized view (FIG. 2B), i.e., point $A_{syn}$ in the synthesized view, fluctuated drastically in temporal domain. This would appear unnatural to the viewers, potentially annoying them. Existing 2D and 3D view quality assessment (VQA) metrics have not well considered the properties of the synthesized virtual view videos and the flicker distortion. Therefore, there is a need for a more effective quality assessment method for application in synthesized videos.

Sparse representation can be used to represent visual features and receptive field. In this embodiment, sparse representation is used to represent temporal flickering and to evaluate the 3D video quality.

Conventional sparse representation and dictionary learning based on 2D spatial patches were used to represent the 2D image features. Currently, 3D dictionary learning, which further include the temporal or depth dimension, has been employed in several video applications, such as online sequence de-noising in M. Protter and M. Elad, "*Image Sequence Denoising via Sparse and Redundant Representations,*" IEEE Trans. Image Process., vol. 18, no. 1, pp. 27-35, January 2009, video super-resolution in H. Xiang, Z. Pan, X. Ye and C. W. Chen, "*Sparse spatio-temporal representation with adaptive regularized dictionary learning for Low bitrate video coding,*" IEEE Trans. Circuits Syst. Video Technol., vol. 23, no. 4, pp. 710-728, April 2013, and human action identification in S. C. W. Tim, M. Rombaut and D. Pellerin, "*Dictionary of gray-level 3D patches for action recognition,*" 2014 IEEE Int. Workshop Mach. Learn. Signal Process. (MLSP), September 2014, pp. 1-6. The 3D dictionary learning objective function can be formulated as $$\min_{\Psi^{3D}, \alpha^{3D}} \|X^{3D} - \Psi^{3D}\alpha^{3D}\|_2^2 + \mu\|\alpha_i^{3D}\|_1 + \lambda\rho(X^{3D}) \quad (1)$$

where $X^{3D}=[x1, x2, \ldots, x_i, \ldots, x_n]$ denotes the 3D training patches set from video data. $x_i \in R^3$ is a 3D volumetric data, consisting of horizontal x, vertical y, and temporal t dimensions, which is denoted as 3D-XYT.

$\Psi^{3D}$ is the learned 3D dictionary. $\alpha^{3D}$ is a simplified form of the sparse coefficients of the overall 3D patches. $\|.\|_1$ refers to the $L_1$ norm of the vector. $\|\alpha_i^{3D}\|_1$ denotes that the sparse coefficient $\alpha_i^{3D}$ of patch i should satisfy the sparsity constraint, where $\mu$ regulates the sparsity. $\rho(X^{3D})$ represents the task-driven constraint, and $\lambda$ regulates the weight of this term. The advantage of 3D sparse representation is that it can learn 3D dictionaries for better representation ability. However, the computational complexity of learning 3D dictionaries increases dramatically. One alternative solution is degrading 3D dictionary learning and approximating it with multi-layer 2D dictionaries. In fact, 2D sparse representation for 2D image (i.e., 2D-XY data) can be regarded as a special case or degradation of 3D sparse representation (i.e., 3D-XYT data) by fixing the temporal dimension. In order to represent the flicker distortion in the temporal domain of synthesized video, this embodiment attempts to keep the temporal dimension and fix either X or Y in the 3D sparse representation, i.e., 2D-XT or 2D-YT plane. Then, the sparse representation is customized to represent the temporal flickering features for the synthesized video.

I. Sparse Representation Based Flicker Distortion Measurement (SR-FDM)

One embodiment of the invention provides a sparse representation based flicker distortion measurement (SR-FDM) framework. The framework mainly consists of five main steps/modules: temporal layer conversion, gradient feature ex traction, flicker distortion detection, sparse representation for flicker distortion features, and weighted layer pooling.

Figure 3:
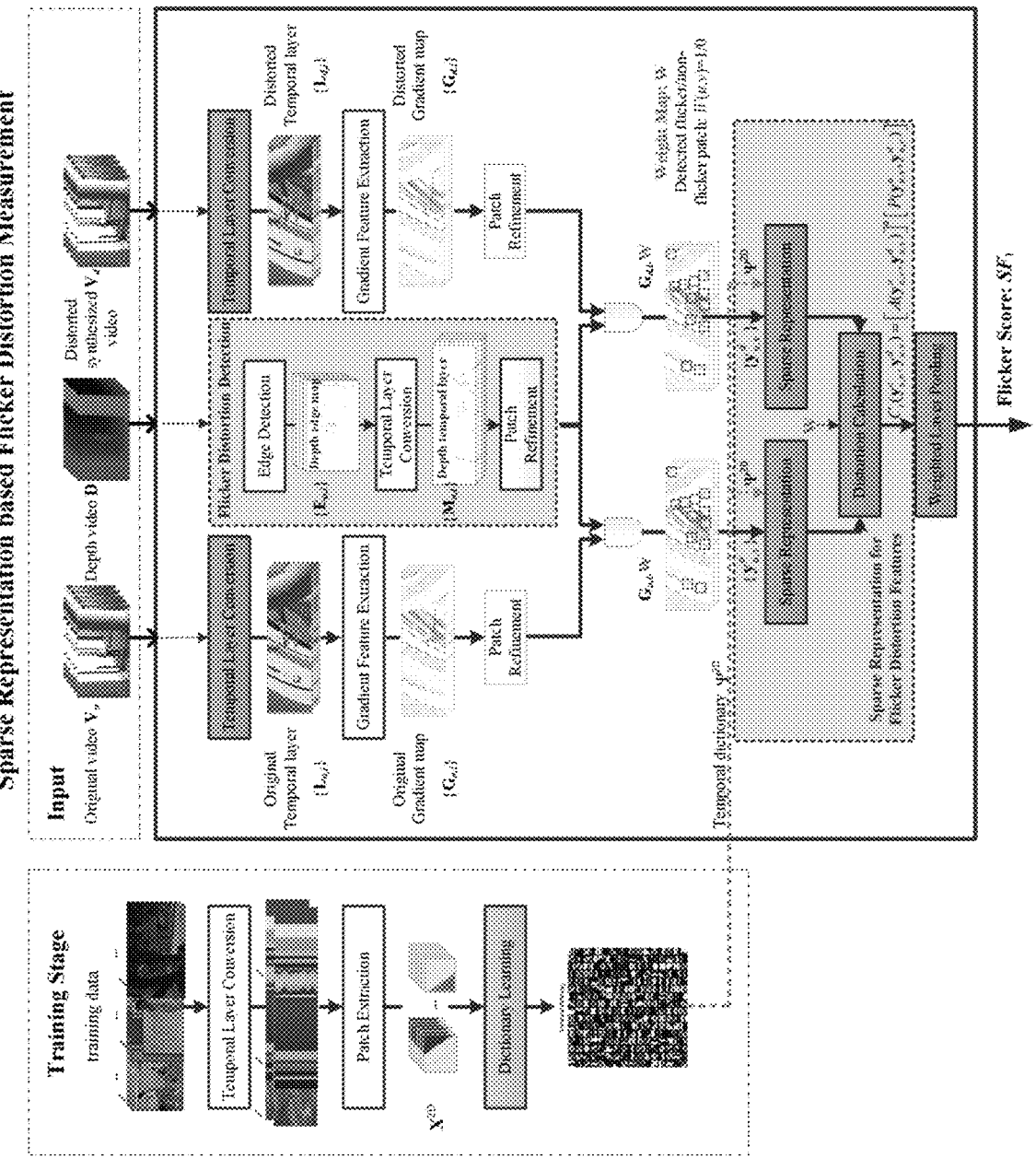
FIG. 3 is a schematic flowchart showing a sparse representation based flicker distortion measurement method in one embodiment of the invention.

FIG. 3 demonstrates the flowchart of the flicker distortion assessment. As shown in FIG. 3, first, an original video and the distorted synthesized video are converted to the temporal layers via temporal layer conversion (subsection A), respectively. Then, each layer will be transformed to gradient feature map after gradient feature extraction (subsection B). Afterwards, for each layer, the location of possible flicker distortion is identified through flicker distortion detection module with the help of the associated depth video (subsection C). Subsequently, flicker distortion strengths are measured through the sparse coefficients features at the identified flicker distortion location, and the sparse representation is based on the learned temporary dictionary through training stage (subsection D). Finally, the overall flicker distortion score is obtained by weighted layer pooling (subsection E).

A. Temporal Layer Conversion

A video can generally be considered as 3D volumetric data $V=\{V(x,y,t)|1 \leq x \leq W, 1 \leq y \leq H, 1 \leq t \leq T\}$ where H, W, T represent video height (Y), width (X), and frame length (T), respectively. By dividing the 3D-XYT video into multiple 2D-XT layers, the video could be redefined as $V=\{L_i|1 \leq i \leq H\}$, where $L_i=\{V(x,y,t)|1 \leq x \leq W, y=i, 1 \leq t \leq T\}$ is the i-th temporal layer, and the height H is also the total amount of temporal layers, i.e., 2D-XT planes. For VQA of synthesized video, there are three main advantages provided by segmenting a video into temporal layers: (1) visuality: it helps visualize the temporal features and can provide an explicit and intuitional cues; (2) capability: the temporal layer picture, a surface formed by space lines varying with time, can be used to present the long-term temporal features of the video; (2) simplicity: it avoids employing motion estimation method to match the patch between t-i-th frame and t-th frame to capture the motion features.

Figure 4:
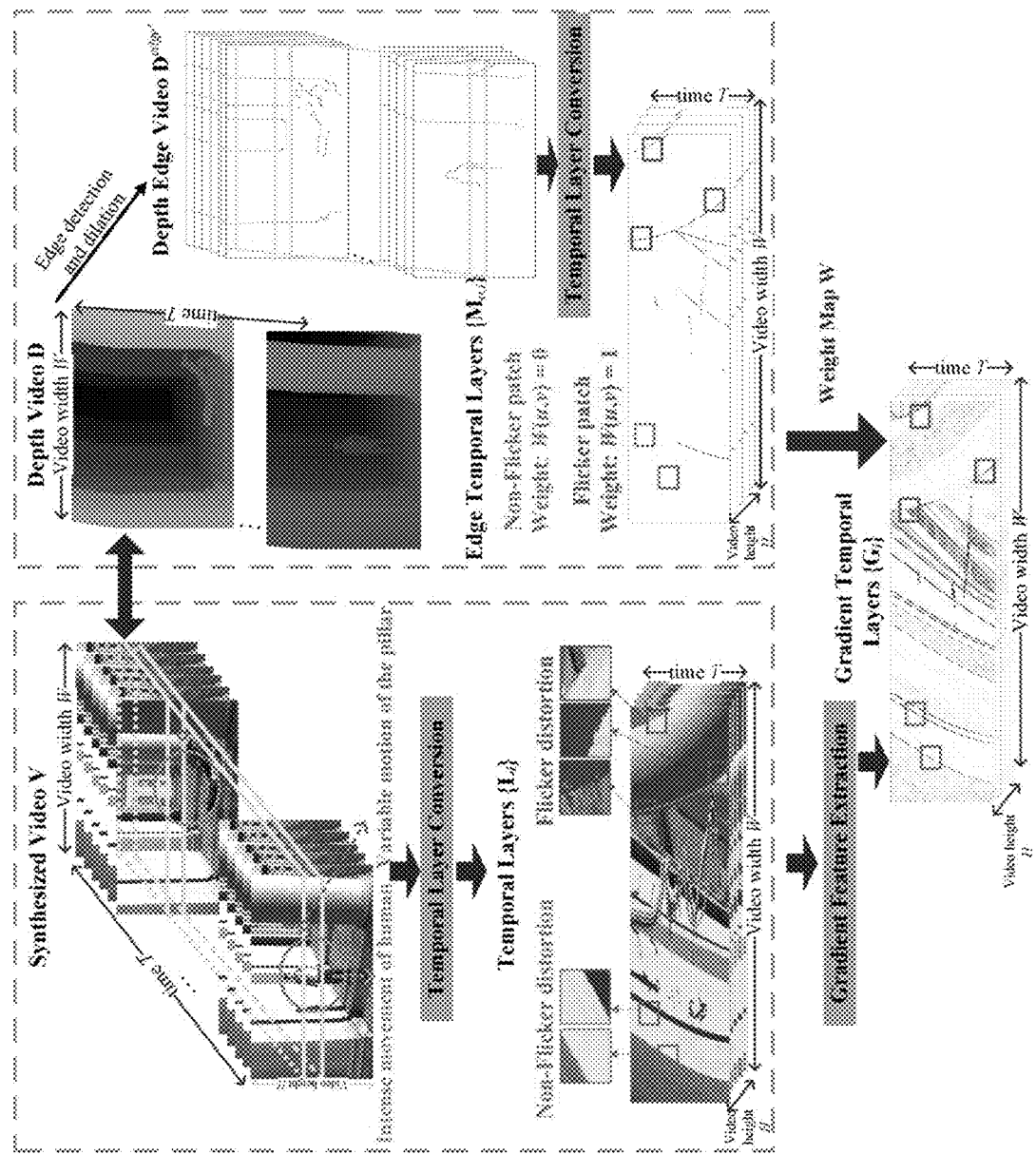
FIG. 4 is a schematic flowchart illustrating visual effects of flicker distortion in temporal layer in the method of FIG. 3.

Therefore, to assess the flicker distortion more effectively, this embodiment converts the distorted 3D synthesized video V into temporal layers $\{L_i\}$, i.e., 2D-XT plane, as shown in the left part of the FIG. 4. It can be observed that the intense movement of the human and the variable motion of one point along the rim of the pillar are represented as a drastically twisted stripe and a smooth curve line respectively. This illustrates that the temporal layer can capture the temporal features. In addition, the distortion in the patches with flicker distortion is obvious, e.g., the crumbling and disorderly edges, while the non-flicker patch has clear edges. This phenomenon implies that the flicker distortion could be captured in the temporal layer. Thus, the original view $V_o$ and the distorted synthesized view $V_d$ are converted to sets of temporal layers $\{L_{o,i}\}$ and $\{L_{d,i}\}$, respectively.

B. Gradient Feature Extraction

The gradient features are more suitable to extract the flicker distortion as compared with the pixel intensity itself because: (1) human eyes are sensitive to the change rate of the intensity which leads to the significant change in the gradient; and (2) the flicker distortion caused by temporal inconsistency of depth map usually locate at edges or regions with gradient. In this embodiment, vertical gradient features of the temporal layers are used to capture the flicker distortion to avoid the interference of the static situation. For a static object, an arbitrary point on its boundaries as time varies would be a vertical line, which would result in large horizontal gradient in temporal layer.

Figure 5B:
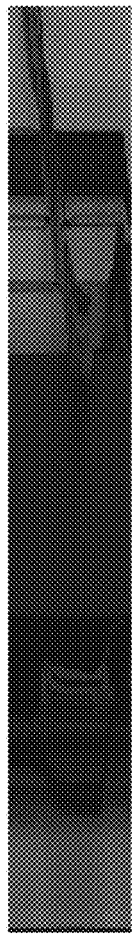
FIG. 5B is a temporal layer generated by the horizontal line in FIG. 5A.
Figure 5C:
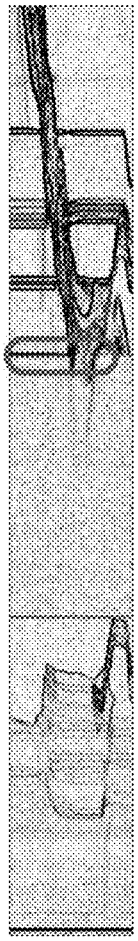
FIG. 5C is a gradient map (with both horizontal and vertical gradients) corresponding to the temporal layer of FIG. 5B.
Figure 5D:
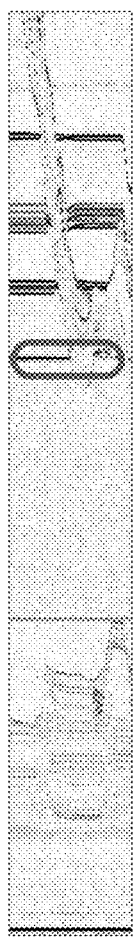
FIG. 5D is a gradient map (with horizontal gradient only) corresponding to the temporal layer of FIG. 5B.
Figure 5E:
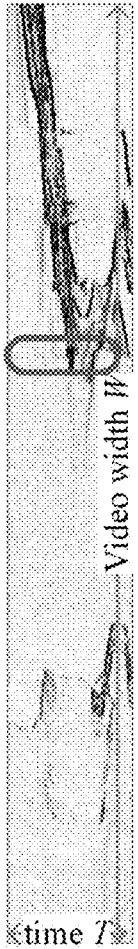
FIG. 5E is a gradient map (with vertical gradient only) corresponding to the temporal layer of FIG. 5B.
Figure 5A:
FIG. 5A is a video frame synthesized with original video and depth video.
Figure 6A:
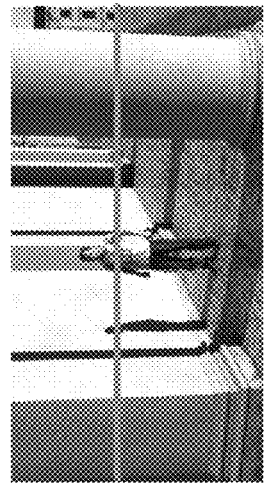
FIG. 6A is a video frame of an original video.
Figure 6B:
FIG. 6B is temporal layer generated by the horizontal line in FIG. 6A, along with zoomed-in views of the rectangles marked on the temporal layer.
Figure 6C:
FIG. 6C is a gradient feature map corresponding to the temporal layer of FIG. 6B, along with zoomed-in views of the rectangles marked on the temporal layer.
Figure 6D:
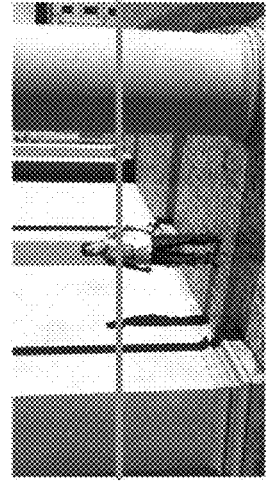
FIG. 6D is a video frame of a synthesized video corresponding to the original video of FIG. 6A.
Figure 6E:
FIG. 6E is temporal layer generated by the horizontal line in FIG. 6D, along with zoomed-in views of the rectangles marked on the temporal layer.
Figure 6F:
FIG. 6F is a gradient feature map corresponding to the temporal layer of FIG. 6E, along with zoomed-in views of the rectangles marked on the temporal layer.

FIGS. 5A to 5E show a video frame synthesized with original video and depth video, a temporal layer generated by the horizontal line in FIG. 5A, and related gradient maps with and without horizontal gradients in temporal layer of static objects. It can be observed that the gradient map with horizontal and vertical gradients in FIG. 5C and the gradient map with horizontal gradients in FIG. 5D have strong strengths in rectangle areas while the gradient map with vertical gradients in FIG. 5E has very weak features. As shown in FIGS. 5C to 5E, the static objects can generate strong horizontal gradients that reflect no meaningful motion information, thus affecting the true flicker distortion detection. In addition, if flicker distortion exists along the boundaries of the static object, the vertical gradient can captures it.

In this embodiment, for the pixel (x,i,t) in $L_i$, the vertical gradient can be computed as $$V^g(x,i,t)=V(x,i,t=1)-V(x,i,t) \qquad (2)$$

The temporal gradient $G_i=\{V^g(x,i,t)|1 \leq x \leq W, 1 \leq t \leq T\}$ is thus acquired. Therefore, the temporal gradient set $\{G_{o,i}\}$ and $\{G_{d,i}\}$ for the original and distorted synthesized videos are obtained. FIGS. 6A to 6F show a related example. In the rectangles in FIGS. 6B, 6C, 6E, and 6F, taking the video entitled "Undodancer" as an example, the distorted synthesized view (FIG. 6D), when compared with the original view (FIG. 6A), has more obvious black flocculus along the motion trajectory in the gradient temporal layer. This implies that the flicker distortion corresponds to the pattern changes in gradients. In practice, the gradient map needs patch refinement to exclude noises. The random noises in the original video captured by the cameras may cause some small changes in gradients in temporal layer, which are actually not the flicker distortion. In order to reduce the influence of this noise, the patches in the temporal layer are excluded if their gradient variance is small. The effective patches set in G layer can be defined as $$S_{V,i} = \left\{ (u, v) \Big| \frac{\sum_{x=u}^{u+w-1} \sum_{t=v}^{v+w-1} (V^g(x, i, t) - \overline{V_p^g}(x, i, t))^2}{w^2} > g \right\} \qquad (3)$$

$$\overline{V_p^g}(x, i, t) = \frac{\sum_{x=u}^{u+w} \sum_{t=v}^{v+w} V^g(x, i, t)}{w^2} \qquad (4)$$

where (u, v) denotes the patch index, indicating the location of one patch in the i-th temporal layer of the distorted synthesized video. w is the patch size. In this example, the variance threshold g is set as 5.

C. Depth Image Based Flicker Distortion Area Detection

Since not all the areas in the temporal layer include flicker distortion, a flicker distortion area detection algorithm is included in this embodiment to locate the flicker distortion more precisely. In fact, the flicker distortion of synthesized videos usually locates at the object edges, which is mainly caused by the depth temporal inconsistency among frames and misalignment between depth and color videos at the depth edges or discontinuous regions.

As shown in the right part of FIG. 4, the flicker distortion mainly exists in the areas of synthesized view corresponding to depth discontinuities, e.g., strong edges or borders (marked as rectangles). Therefore, depth map and its discontinuities can be utilized to detect the flicker distortion. We use the edge detection operator, e.g., canny, to detect the depth edges of the synthesized depth image and a large threshold is used to get the strong depth edges. The depth edges in the depth map is presented as $E_{o,k} = \{D^{edge}(x,y,t) | 1 \leq x \leq W, 1 \leq y \leq H, t=k\}$.

In addition, especially for distorted synthesized video with depth compression, the location of flicker distortion in synthesized video usually deviates at the texture edges by a few pixels. This may be mainly due to the misalignment between color texture and depth videos and the depth errors induced by compression along the depth edges would easily generate the contour artifacts and neighborhood misplacement in synthesized views. To avoid the missed detection of the flicker area, in one embodiment, image dilation is employed to expand the detected edges width for the depth edge map $E_{o,k}$, and the dilated depth edge map $E_{o,k}' = \{D^{edge'}(x,y,t) | 1 \leq x \leq W, 1 \leq y \leq H, t=k\}$ is obtained by using a squared dilation mask. Since temporal layer images are divided into patches as processing units in this embodiment, dilation radius of 2 is enough to capture the patches with the flicker distortion.

After the edge detection and dilation, the areas where flicker distortion would take place could be detected roughly. Since the flicker distortion on the temporal layer is measured, the edge maps set $\{E_{o,k}'\}$ is converted into temporal edge layers $\{M_{o,i}\}$, where $\{M_{o,i}\} = \{D^{edge=}(x,y,t) | 1 \leq x \leq W, y=i, 1 \leq t \leq T\}$. If the distortion along the edges flicks or changes in a very short time, i.e., the number of edge pixels in temporal layer is very small, the human eyes can hardly perceive this flickering. In this case, it is assumed that possible flicker perception is caused only if the number of edge pixels in patches of the temporal layer $M_{o,i}$ exceeds a threshold B in a predetermined period. The edge patches set in the i-th temporal layer are refined as $$S_{E,i} = \left\{ (u, v) \left| \sum_{x=u}^{u+w-1} \sum_{t=v}^{v+w-1} D^{edge'}(x, i, t) > B \right. \right\} \quad (5)$$

where (u, v) indicates the index of edge patch in the i-th edge temporal layer $M_{o,i}$ of the original depth video. In this example B is set as 1.

The final flicker distortion area $S_i$ in the i-th temporal layer could be obtained based on the textural gradient and depth edges, which is $S_i = S_{V,i} \cap S_{E,i}$. The flicker distortion area of whole video consist of flicker area all the temporal layers, i.e., $\{S_i\}$. In addition, the binarization weight map $W_i$ in each temporal layer $G_i$ can be obtained accordingly as $$W_i(u, v) \begin{cases} 1, & \text{if } (u, v) \in S_i \\ 0, & \text{otherwise} \end{cases} \quad (6)$$

where $W_i(u, v)$ is element of $W_i$. With the assistance of the depth map, the flicker distortion area can be located more accurately.

D. Sparse Representation for Flicker Distortion Features

The sparse representation can be used to measure the distortion between the original and distorted videos in the detected flicker distortion areas, which includes temporal dictionary learning phase and sparse representation phase.

1) Temporal Dictionary Learning: To represent the flicker distortion in the synthesized video, the dictionary that aims to learn the temporal flicker features of 2D-XT or 2D-YT plane could be learned. Since the 2D-XT and 2D-YT plane have the similar effects in capturing the motion features, the dictionary learning function for 2D-XT plane is used and can be derived from Equation (1) as $$\min_{\Psi^{2D}, \alpha^{2D}} \|X^{2D} - \Psi^{2D}\alpha^{2D}\|_2^2, \text{ s.t. } \|\alpha_i^{2D}\|_0 < \varepsilon \quad (7)$$

where $X^{2D}$ denotes the training patches set of 2D-XT from video data. $\Psi^{2D}$ is the learned 2D dictionary for temporal layers. $\|.\|_0$ means the number of nonzero entries in the vector. During dictionary learning, the number of nonzero entries of should not be greater than a given $\varepsilon$. In this example, $\varepsilon$ is set as 6. The dictionary is learned by using K-SVD illustrated in M. Aharon, M. Elad, and A. Bruckstein, "*K-SVD: an algorithm for designing overcomplete dictionaries for sparse representation,*" IEEE Trans. Signal Process., vol. 54, no. 11, pp. 4311-4322, November 2006. During learning, the sparse coefficients are solved by OMP algorithm presented in Y. C. Pati, R. Rezaiifar and P. S. Krishnaprasad, "*Orthogonal matching pursuit: recursive function approximation with applications to wavelet decomposition,*" Proc. Conf. Rec. 27th Asilomar Conf. Signals, Syst. Comput., vol. 1, 1993, pp. 40-44. The learned temporal dictionary is 64×256.

Figure 7B:
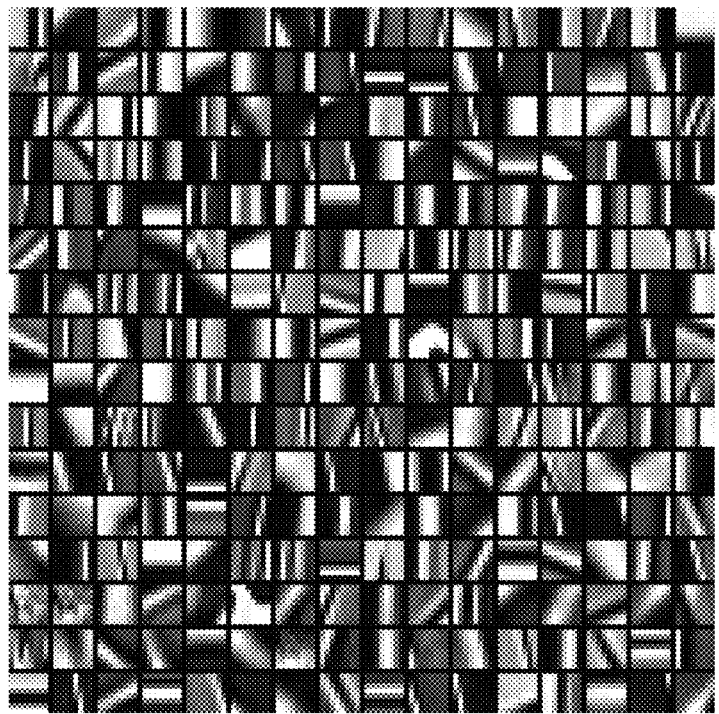
FIG. 7B shows a learned temporal dictionary that can be used in the method of FIG. 3.
Figure 7A:
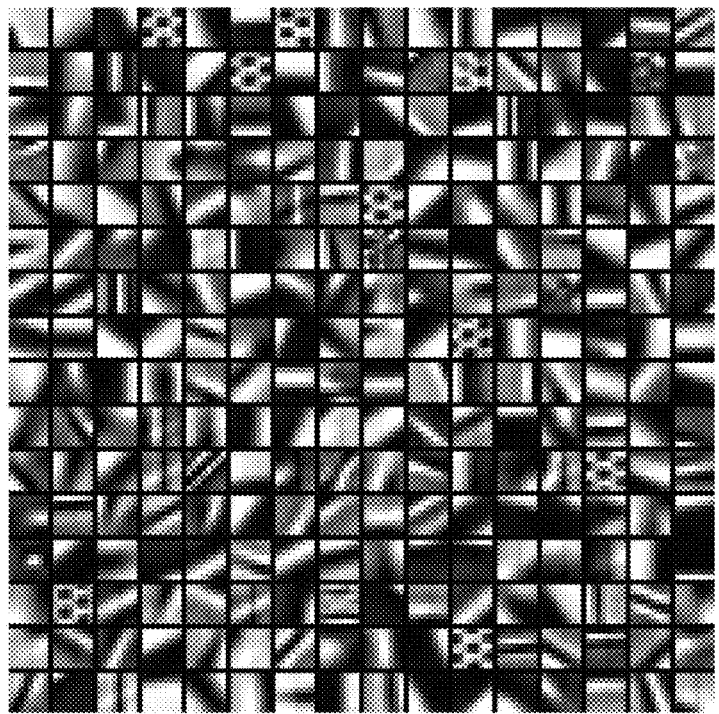
FIG. 7A shows a learned spatial dictionary that can be used in the method of FIG. 3.

To demonstrate the difference between the learned temporal dictionary with the normal spatial dictionary, FIGS. 7A and 7B illustrate the two types of dictionaries for comparison. As shown in FIGS. 7A and 7B, both dictionaries were learned with the same training sequences and learning parameters. The difference is that the spatial dictionary was learned from the conventional image patches while the temporal dictionary was learned from the patches extracted from temporal layers. It is observed from FIGS. 7A and 7B that the learned temporal dictionary, when compared with the spatial dictionary, has more regular and sharper edges which reflect the motion information of the objects in the video. The atom with the vertical edges represents a motionless pattern while atoms with straight edges of other directions represent uniform motion patterns, and atoms with bending edges denote motion patterns with variable velocity. Therefore, the learned temporal dictionary is suitable to capture the temporal activity of the video. The goal of temporal dictionary learning is to learn the normal temporal activity non-flicker distortion. Thus, when the learned dictionary is employed upon the original and distorted synthesized videos via the sparse representation, the flicker distortion existing in the distorted videos could be distinguished.

2) Sparse Representation for Flicker Distortion: In this embodiment, to represent the flicker distortion, two types of features based on sparse representation are used as the distortion features. One is phase distortion, which is employed to measure the flocculus shape features of the flicker distortion; the other is amplitude distortion, which can capture the strength of the flicker distortion. For patches $y_{u,v}^{o,i}$ in the original video and its corresponding patch $y_{u,v}^{o,i}$ in the distorted synthesized video in the i-th temporal layer, the two features can be written as $$P_i(y_{u,v}^{o,i}, y_{u,v}^{d,i}) = \begin{cases} \frac{|\langle \alpha_{u,v}^{o,i}, \alpha_{u,v}^{d,i} \rangle| + e}{\|\alpha_{u,v}^{o,i}\|_2 + \|\alpha_{u,v}^{d,i}\|_2 + e}, & \text{if } W_i(u, v) = 1 \\ 1, & \text{else} \end{cases} \quad (8)$$

$$A_i(y_{u,v}^{o,i}, y_{u,v}^{d,i}) = \begin{cases} 1 - \frac{|\|\alpha_{u,v}^{o,i}\|_2 - \|\alpha_{u,v}^{d,i}\|_2| + e}{\|\alpha_{u,v}^{o,i}\|_2 + \|\alpha_{u,v}^{d,i}\|_2 + e}, & \text{if } W_i(u, v) = 1 \\ 1, & \text{else} \end{cases} \quad (9)$$

where $\alpha_{u,v}^{o,i}$ and $\alpha_{u,v}^{d,i}$ are the sparse coefficients of the original patch $y_{u,v}^{o,i}$ and the distorted patch $y_{u,v}^{d,i}$ with respect to the learned dictionary $\Psi^{2D}$ by Equation (7), respectively. (•) denotes the inner product. c is a constant with a small value added to prevent the denominator to be zero which is set as 0.02. $P(y_{u,v}^{o,i}, y_{u,v}^{d,i})$ computes the phase similarity between sparse coefficients $\alpha_{u,v}^{o,i}$ and $\alpha_{u,v}^{d,i}$, and can be used to measure the structural similarity between $y_{u,v}^{o,i}$ and $d_{u,v}^{d,i}$. $A(y_{u,v}^{o,i}, y_{u,v}^{d,i})$ measures the amplitude similarity between $y_{u,v}^{o,i}$ and $y_{u,v}^{d,i}$ through sparse coefficients. $P(y_{u,v}^{o,i}, y_{u,v}^{d,i})$ and $A(y_{u,v}^{o,i}, y_{u,v}^{d,i})$ are both among the range [0, 1]. The combination of Equations (8) and (9) can be used to measure the integral similarity between patch $y_{u,v}^{o,i}$ and $y_{u,v}^{d,i}$. In fact, $P(y_{u,v}^{o,i}, y_{u,v}^{d,i})$ and $A(y_{u,v}^{o,i}, y_{u,v}^{d,i})$ represent the non-flicker features and they may be large in representing flicker distortions.

Since human eyes tend to perceive the flicker distortion in the form of regions instead of lines, the flicker distortion can be computed over multiple temporal layers instead of a single layer. For simplicity, the sparse coefficients $P(y_{u,v}^{o,i}, y_{u,v}^{d,i})$ and $A(y_{u,v}^{o,i}, y_{u,v}^{d,i})$ of a group of temporal layers, i.e., $U_k = \{L_i | h_s(k-1)+1 \leq i \leq h_s k\}$, $$k \in \left[1, \frac{H}{h_s}\right],$$

are averagely merged, and the integral similarity for patches locating (u, v) at $$\overline{C_k(u, v)} = \frac{1}{h_s} \sum_{i=h_s(k-1)+1}^{h_s k} [A_i(y_{u,v}^{o,i}, y_{u,v}^{d,i})]^a [P_i(y_{u,v}^{o,i}, y_{u,v}^{d,i})]^b \quad (10)$$

where $h_s$ is the number of temporal layers for averaging, k is an index of $U_k$, and a and b are parameters denoting weights of amplitude and phase distortion. In this example, a and b are set as 1 respectively, meaning that the amplitude and phase distortions are of equivalent importance in the quality assessment. Finally, the score of the flicker distortion of $U_k$ can be obtained as $$SF_k = \frac{\sum_u \sum_v (1 - \overline{C_k(u, v)})}{\sum_u \sum_v \overline{W(u, v)}} \quad (11)$$

where the weight map $\overline{W(u,v)}$ is obtained by $$\overline{W(u, v)} = \begin{cases} 1, & \text{if } (u, v) \in \bigcup_{i=h_s(k-1)+1}^{h_s k} S_i \\ 0, & \text{otherwise} \end{cases} \quad (12)$$

E. Weighted Pooling for Temporal Layers

Since the group of temporal layers $U_k$ may contribute unevenly to the visual perception, in this embodiment a weighted pooling scheme is provided for the temporal layers. It is determined that the temporal layer with more edge patches probably makes more contribution to the final perception of the flicker distortion. Therefore, a rank-based method as presented in L. Li, Y. Zhou, K Gu, W. Lin and S. Wang, "*Quality assessment of DIBR-synthesized images by measuring local geometric distortions and global sharpness,*" IEEE Trans. Multimedia, vol. 20, no. 4, pp. 914-926, April 2018 and K. Gu, S. Wang, G. Zhai, W. Lin, X. Yang and W. Zhang, "*Analysis of distortion distribution for pooling in image quality prediction,*" IEEE Trans. Broadcast., vol. 62, no. 2, pp. 446-456, June 2016 is applied to pool the scores among temporal layers. The flicker score of the whole distorted video $SF_V$ is $$SF_V = \frac{\sum_{k=1}^{H_s} w_k SF_k}{\sum_{k=1}^{H_s} w_k} \quad (13)$$

where $w_k$ represents the weight of each layer, $$H_s = \frac{H}{h_s},$$

$SF_k$ represents the flicker score of the k-th group temporal layer $U_k$. This $SF_V$ score is normalized to range [0, 1] through the normalization of the summation of the weight of $w_k$, which is calculated as $$w_k = \log_2\left(1 + \frac{Rank_k}{H_s}\right) \quad (14)$$

where $Rank_k$ represents the rank of the $U_k$ among all layers in term of the importance, i.e., the number of edge patches. In this way, the flicker distortion score $SF_V$ of the distorted synthesized video can be obtained.

II. The Sparse Representation Based 3D View Quality Assessment (SR-3DVQA) Model

The distortions of synthesized video mainly have two categories. One is the flicker distortion, the other is the conventional spatial-temporal activity distortions (such as compression artifacts, rendering distortion, contour and hole artifacts) in synthesized video.

FIG. 8 shows a sparse representation based 3D view quality assessment (SR-3DVQA) method in one embodiment of the invention. The SR-3DVQA model mainly includes two modules: SR-FDM (as presented above) and the spatial-temporal activity distortion measurement. Both the original video and the distorted synthesized video are input into the two modules. Additionally, the synthesized depth video is input into the SR-FDM module.

The overall quality score of a compressed synthesized video is predicted by pooling the flicker distortion score and the spatial-temporal activity distortion score.

A. Spatial-Temporal Activity Distortion Measurement

Figure 9:
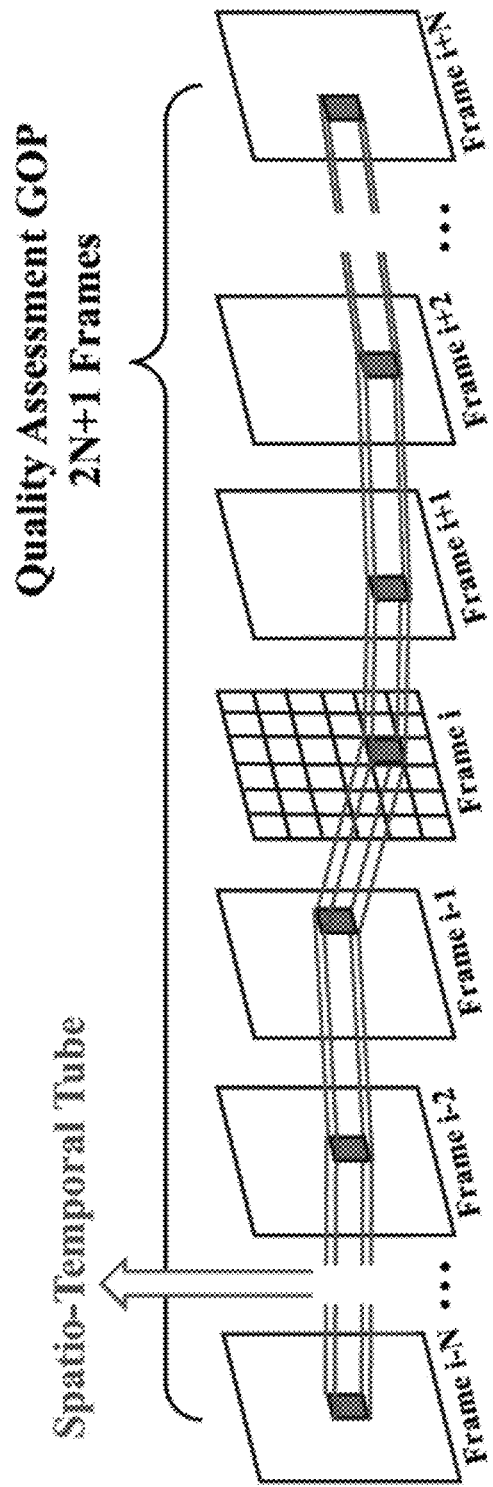
FIG. 9 is a schematic illustrating a spatio-temporal tube and Group of Pictures (GoP) quality assessment method in one embodiment of the invention.

This embodiment employs the same method to assess spatial activity distortion as that in X. Liu, Y. Zhang, S. Hu, S. Kwong, C. C. J. Kuo and Q. Peng, "*Subjective and objective video quality assessment of 3D synthesized views with texture/depth compression distortion,*" IEEE Trans. Image Process., vol. 24, no. 12, pp. 4847-4861, December 2015, which mainly measures the variance difference of the pixel gradients in a spatiotemporal tube. The concept of Quality Assessment Group of Pictures (QA-GoP) and Spatial-temporal (S-T) tube are introduced in the spatial-temporal activity distortion measurement method, which is illustrated in FIG. 9. A video is divided into several QA-GoPs, which is made up of a number of frames, e.g., 2N+1 frames as shown in FIG. 9. A QA-GoP consists of multiple S-T tubes, which are concatenated by matched blocks via motion estimation algorithms in adjacent frames and denote the motion trajectory. Given the original video $V_o$ and distorted synthesized video $V_d$, first of all, the pixel gradients $G_o^S(x,y,t)$, and $G_d^S(x,y,t)$, are computed by calculating the norm of the pixel gradient vector composed of horizontal and vertical spatial gradients at frame t, respectively.

$$G_\varphi^S(x,y,t) = \sqrt{|\nabla G_{\varphi,x}^S(x,y,t)|^2 + |\nabla G_{\varphi,y}^S(x,y,t)|^2} \quad (15)$$

where $\varphi \in \{o,d\}$, $\nabla G_{\varphi,x}^S(x,y,t)$, $\nabla G_{\varphi,y}^S(x,y,t)$ are gradients in the horizontal and vertical directions, respectively. Then, the gradients are organized by S-T tube, and the standard deviation of the gradients in the i-th S-T tube in a QA-GoP is computed as $$\sigma_\varphi^{tube}(x_n, y_n, t_n) = \quad (16)$$

$$\sqrt{\frac{\sum_{t=t_n-N}^{t_n+N} \sum_{x=x_n}^{x_n+w-1} \sum_{y=y_n}^{y_n+h-1} (G_\varphi^S(x,y,t) - \overline{G_{\varphi,tube}^S}(x,y,t))^2}{w \times h \times (2N+1)}}$$

$$\overline{G_{\varphi,tube}^S}(x,y,t) = \frac{\sum_{t=t_n-N}^{t_n+N} \sum_{x=x_n}^{x_n+w-1} \sum_{y=y_n}^{y_n+h-1} G_\varphi^S(x,y,t)}{w \times h \times (2N+1)} \quad (17)$$

where w and h are width and height of the tube in spatial domain. N is the number of forward or backward frames involved in a S-T tube. The spatial-temporal activity $R_{\varphi,i}^{tube}$ can be then obtained by clipping $\sigma_\varphi^{tube}(x_n,y_n,t_n)$, where i is the index of for tube $\{x_n,y_n,t_n\}$. They are calculated as $$R_{\varphi,i}^{tube} = \begin{cases} \sigma_\varphi^{tube}(x_n, y_n, y_n), & \text{if } \sigma_\varphi^{tube}(x_n, y_n, t_n) > \tau \\ \tau, & \text{otherwise} \end{cases} \quad (18)$$

where $\tau$ is the perceptible threshold for spatial-temporal gradient standard deviation, and is set as 180 in this example. Afterwards, the distortion score of a QA-GoP is calculated through worstcase pooling strategy, and the overall spatial-temporal distortion score of the whole video is obtained as $$SA_V = \frac{1}{N_{all}} \sum \frac{1}{N_\Phi} \sum_{i \in \Phi} \left| \log_{10} \left( \frac{R_{d,i}^{tube}}{R_{o,i}^{tube}} \right) \right| \quad (19)$$

where $\Phi$ denotes the set of the worst 5% percent S-T tubes in a QA-GoP, $N_\Phi$ denotes the number of tubes in set $\Phi$, $N_{all}$ represents the number of QA-GoP in a test video.

B. Pooling

A general pooling method combining the summation and the multiplication is explored to integrate the flickering and spatial-temporal distortions in assessing the synthesized video quality, which can be written as $$S_V = c \times (w_1 SF_V + w_2 SA_V) = d \times f(SF_V) \times SA_V \quad (20)$$

where c, d are weighted parameters to balance the relative importance of the summation and multiplication pooling items. $f(.)$ denotes the nonlinear map function of the flicker distortion score in multiplication pooling. $w_1$, $w_2$ are used to weigh the flicker distortion score and the spatial-temporal activity distortion score in summation pooling. When d is set to zero, Equation (20) is degenerated to the summation. Similarly, when c is set to zero, Equation (20) is degenerated to the multiplication.

In this embodiment, $f=(\bullet)=x$, c, d, $w_1$, $w_2$ are set as 1, 0, 0.5, 0.5, respectively, which denotes the flicker distortion and spatiotemporal activity distortion are summated in the pooling stage. The impacts of the pooling method, weight parameters and mapping function $f(.)$ are discussed in Section III subsection D.

III. Experimental Results and Analyses

Experiments and simulations have been performed to assess the performance of the method of the above embodiments. This section first presents the Canny threshold determination for edge detection. Then, the quality assessment performance is compared among the proposed SR-3DVQA test is conducted subsequently. Finally, the impacts of the pooling method and the reference depth video are evaluated.

A. Canny Threshold Determination

It is important to choose a suitable Canny threshold in depth edge detection for flicker area detection. In this example, the edge detection effects among different canny thresholds are compared.

FIGS. 10A to 12I demonstrate the relationship between the flicker areas in the synthesized view and the Canny thresholds in depth edge detection on sequence "Balloons" (FIGS. 10A to 10I), "Lovebird1" (FIGS. 11A to 11I), and "Undodancer" (FIGS. 12A to 12I). FIGS. 10A, 11A, and 12A are the respective synthesized textural image, FIGS. 10B, 11B, and 12B are the respective depth image, and FIGS. 10C-10I, 11C-11I, 12C-12I are edge maps generated by Canny edge detectors with different thresholds from 0.03 to 0.5, respectively. The marked rectangles in the FIGS. 10A to 12I are the area with the flicker distortion. While selecting an optimal threshold, the depth edges in the rectangles (corresponding to flicker areas), shall all be detected, and the edges outside the rectangles shall not be included (or included as few as possible). It can be observed that edge maps generated by thresholds from 0.1 to 0.5 are more consistent to this flicking area for sequence "Balloons", where strong edges of balloons and ribbons inside the rectangles are detected and less edges of plants and the man outside the rectangles are detected. In this case, thresholds among range 0.1 to 0.5 seem suitable for sequence "Balloons". Similar result for "Lovebirds". For "Undodancer", the flicker mainly concentrates on the upper body of the dancer and the rightmost and foremost pillar, so thresholds among range 0.07 to 0.2 are feasible. According to results among the test sequences, threshold 0.2 is selected for the edge detection in this example.

B. Quality Prediction Performance Comparisons

In this subsection, the training dataset, testing dataset, and settings of the SR-3DVQA model are first introduced. Then, the quality prediction performances among different methods (including the SR-3DVQA model) are compared.

1) Settings for Temporal Dictionary Learning: Due to the temporal inconsistency in the generated depth video, the synthesized video rendered from the original texture videos and depth videos may also have noticeable flicker distortion. Therefore, the original view instead of the original synthesized video is preferred for temporal dictionary learning. For the original texture video in MVD system that has similar temporal properties with the conventional single-view video, the conventional videos from HEVC test sequences were selected as training sequences so as to separate the training sequences from the test sequences. To cover different spatial resolution and content, eight 2D video sequences were selected in the temporal dictionary learning. These videos are entitled "BasketballDrive", "FourPeople", "Flowervase", "Johnny", "KristenAndSara", "ParkScene", "RaceHorses", and "Vidyo3". The properties of the training sequences are shown in FIG. 13. The first 300 or 240 frames of each sequence were kept in training. For each sequence, four temporal layers were extracted at a uniform sampling way along the frame height. Then 32 different temporal layers in total were extracted. Temporal layer images with pixel intensity are directly employed as the feature maps in dictionary learning. These images were then divided into patches with size 8×8 and one-pixel overlap, which were collected as the training dataset for temporal dictionary learning.

2) Dataset and Settings for SR-3DVQA Prediction: The SIAT synthesized video database of X. Liu, Y. Zhang, S. Hu, S. Kwong, C. C. J. Kuo and Q. Peng, "Subjective and objective video quality assessment of 3D synthesized views with texture/depth compression distortion," IEEE Trans. Image Process., vol. 24, no. 12, pp. 4847-4861, December 2015 was adopted as the testing dataset. This testing dataset is totally different from the learning dataset. This testing dataset consists of 10 MVD sequences and 140 synthesized videos in 1024×768 and 1920×1088 resolution which were obtained by 14 different combinations of compressed texture/depth videos, namely generated with different quantization parameters. Each video was synthesized by two views composed of two texture videos and their corresponding depth videos. Depending on whether the texture/depth video is "compressed" or "uncompressed", the generated distorted synthesized videos are categorized into four subsets: $U_T U_D$, $U_T C_D$, $C_T U_D$, and $C_T C_D$. 'C' and 'U' mean the videos are "compressed" and "uncompressed" respectively while the subscripts 'T' and 'D' denote texture videos and depth videos respectively. Taking $C_T C_D$ for example, it represents the synthesized video subset were synthesized from the texture and depth videos with compression distortions. The subjective experiment was conducted by single stimulus paradigm with continuous score. Difference Mean Opinion Scores (DMOS) were provided. The parameter settings in the SR-3DVQA method of the one embodiment are as follows: the dictionary size is 64×256, the sparsity ε for training and testing are both 6, the patch size in the temporal layer is 8×8, the layer size $h_s$ is 8, the patch variance threshold g is 5, the edge number threshold B is 1, the canny threshold is set as 0.2, and the dilation mask is 2×2.

The comparison methods include three categories: eight conventional 2D IQA/VQA metrics:

Peak signal-to-noise ratio (PSNR)

SSIM illustrated in Z. Wang, A. C. Bovik, H. R. Sheikh, and E. P. Simoncelli, "Image quality assessment: From error visibility to structural similarity," IEEE Trans. Image Process., vol. 13, no. 4, pp. 600-612, April 2004

WSNR illustrated in N. Damera-Venkata, T. D. Kite, W. S. Geisler, B. L. Evans, and A. C. Bovik, "Image quality assessment based on a degradation model," IEEE Trans. Image Process., vol. 9, no. 4, pp. 636-650, April 2000

MSSSIM illustrated in Z. Wang, E. P. Simoncelli, and A. C. Bovik, "Multiscale structural similarity for image quality assessment," in Proc. Conf. Rec. 37th Asilomar Conf. Signals, Syst. Comput., vol. 2. November 2003, pp. 1398-1402

IW-SSIM illustrated in Z. Wang and Q. Li, "Information content weighting for perceptual image quality assessment," IEEE Trans IW-PSNR illustrated in Z. Wang and Q. Li, "Information content weighting for perceptual image quality assessment," IEEE Trans VQM illustrated in M. H. Pinson and S. Wolf, "A new standardized method for objectively measuring video quality," IEEE Trans. Broadcast., vol. 50, no. 3, pp. 312-322, September 2004

MOVIE illustrated in K Seshadrinathan and A. C. Bovik, "Motion tuned spatio-temporal quality assessment of natural videos," IEEE Trans. Image Process., vol. 19, no. 2, pp. 335-350, February 2010 seven 3D synthesized IQA metrics:

Bosc illustrated in E. BoscR. Pepion, P. L. Callet, M. Koppel, P. Ndjiki-Nya, M. Pressigout and L. Morin, "Towards a new quality metric for 3D synthesized view assessment," IEEE J. Sel. Topics Signal Process., vol. 5, no. 7, PP. 1332-1343, November 2011

MP-PSNR illustrated in D. Sandić-Stanković, D. Kukolj, and P. Le Callet, "Multi-scale synthesized view assessment based on morphological pyramids," J. Elect. Eng., vol. 67, no. 1, pp. 3-11, 2016

MW-PSNR illustrated in D. Sandić-Stanković, D. Kukolj, and P. Le Callet, "DIBR synthesized image quality assessment based on morphological wavelets," in Proc. IEEE 7th Int. Workshop Quality Multimedia Exper. (QoMEX), May 2015

MP-PSNRr illustrated in D. Sandić-Stanković, D. Kukolj, and P. Le Callet, "DIBR-synthesized image quality assessment based on morphological multi-scale approach," EURASIP J. Image Video Process., vol. 1, pp. 1-23, March 2017

MW-PSNRr illustrated in D. Sandić-Stanković, D. Kukolj, and P. Le Callet, "DIBR-synthesized image quality assessment based on morphological multi-scale approach," EURASIP J. Image Video Process., vol. 1, pp. 1-23, March 2017

3DSwIM illustrated in F. Battisti, E. Bosc, M. Carli, and P. L. Callet, "Objective image quality assessment of 3D synthesized views," Signal Process. Image Commun., vol. 30, pp. 78-88, January 2015

LOGS illustrated in L. Li, Y. Zhou, K. Gu, W. Lin and S. Wang, "Quality assessment of DIBR-synthesized

*images by measuring local geometric distortions and global sharpness," IEEE Trans. Multimedia, vol. 20, no. 4, pp. 914-926, April 2018* and three synthesized VQA metrics:

PSPTNR illustrated in Y. Zhao and L. Yu, *"A perceptual metric for evaluating quality of synthesized sequences in 3DV system," Proc. SPIE, vol. 7744, pp. 77440X, August 2010*

Liu illustrated in X. Liu, Y. Zhang, S. Hu, S. Kwong, C. C. J. Kuo and Q. Peng, *"Subjective and objective video quality assessment of 3D synthesized views with texture/depth compression distortion," IEEE Trans. Image Process., vol. 24, no. 12, pp. 4847-4861, December 2015*

FDI illustrated in Y. Zhou, L. Li, S. Wang, J. Wu, Y. Zhang, *"No-reference quality assessment of DIBR-synthesized videos by measuring temporal flickering," J. Vis. Commun. Image R., vol. 55, pp. 30-39, August 2018*

Note for the IQA metrics, the score of each video was obtained by averaging the scores of all the frames in the video. In addition, the results of FDI, a non-reference method, are referred from Y. Zhou, L. Li, S. Wang, J. Wu, Y. Zhang, *"No-reference quality assessment of DIBR-synthesized videos by measuring temporal flickering," J. Vis. Commun. Image R., vol. 55, pp. 30-39, August 2018* with the whole SIAT synthesized video database.

To measure the performance of the quality assessment, Spearman Rank Order Correlation Coefficient (SROCC), Pearson Linear Correlation Coefficient (PLCC), and Root Mean Squared Error (RMSE) were used. The five-parameter nonlinear regression function was used, which is $$f(x) = \eta_1 \left( \frac{1}{2} - \frac{1}{1 + e^{\eta_2 (x - \eta_3)}} \right) + \eta_4 x + \eta_5 \quad (21)$$

where $\eta_1$ to $\eta_5$ are fitting parameters, x denotes the objective score of the quality metrics, $f(x)$ is the predicted subjective score obtained by nonlinearly fitting x to range [0, 1]. The scores of all the comparison methods would employ Equation (21) to map the objective scores to the predicted DMOS.

FIG. 14 shows the performance comparison between the benchmark methods (listed above) and the SR-3DVQA method of the present embodiment on the SIAT database, which includes three subsets $U_T C_D$, $C_T U_D$, $C_T C_D$, and the ALL dataset consists of the three subsets. Video samples in $U_T U_D$ are included into $C_T C_D$. For all performance indices SROCC, PLCC, and RMSE on different subsets and ALL dataset, the best method is marked in bold. As shown in FIG. 14, for $U_T C_D$ dataset where the depth video was distorted, conventional 2D metrics IW-SSIM and MSSSIM perform better than other benchmark schemes. This is because the depth distortion causes the geometrical distortion in the rendered view, and conventional 2D metric, such as PSNR, may overestimate the geometrical distortion. The performance of LOGS, a metric proposed for 3D synthesized image, follows the IW-SSIM and MSSSIM. The PLCC and SROCC values of Liu and the SR-3DVQA method of the present embodiment are much higher than all the rest methods. The method of the present embodiment has the highest performance with dominant superiority. This indicates that the method of the present embodiment can predict the flicker distortion very well and have better consistency with human perception. For $C_T U_D$, three 2D quality metrics IW-SSIM, WSNR, and VQM are good, since they are designed for compression and structural distortion for 2D images/videos which are probably the main distortions in $C_T U_D$. All the 3D synthesized image/video metrics didn't perform well except Liu and the method of the present embodiment. This is because the other methods have not considered the distortion induced by the compressed texture videos. Similar to $U_T C_D$, the SR-3DVQA method of the present embodiment performs the best in term of the PLCC, SROCC and RMSE. Similarly, on $C_T C_D$, the SR-3DVQA method of the present embodiment performs the best among them while Liu and IW-SSIM have very similar performance, and MSSSIM and SSIM perform fairly good and are better than other methods. In the ALL dataset, IW-SSIM ranks third after Liu and the SR-3DVQA method of the present embodiment. Liu's method ranks the second while the SR-3DVQA method of the present embodiment is the best among all benchmark schemes considered.

C. Statistical Significance Test for SR-3DVQA

Moreover, to further verify the effectiveness of the proposed method, statistical significance test was performed. F-test based on the result of the variance ratio of the predicted residuals between two methods was used to indicate the significance. The predicted residual is obtained from $DMOS_P$ predicted by test model and the ground truth DMOS, which can be described as $$res(k) = DMOS_P(k) - DMOS(k) \quad (22)$$

where res(k) represents the predicted residual of the test model on video k. The variance of the residuals, termed as $Var_i$, of the test model i on all the videos could be calculated. Then, the variance ratio $R_{i,j}$ between test models i and j could be computed, which could be written as $$R_{i,j} = \frac{Var_i}{Var_j} \quad (23)$$

If $R_{i,j}$ is greater than the F-ratio threshold which is determined by the sample size and the significance level, it means the performance of test model j is significantly superior to that of test model i; otherwise, the difference is insignificant. Based on the variance ratios between the above listed benchmark schemes and the SR-3DVQA method of the present embodiment on the four datasets, the significance test results can be obtained. The variance ratios and significance results are listed in column as '$R_{i,j}$/sig.' in FIG. 15, where $R_{i,j}$ is the variance ratio and sig. is the significance result. The symbol '1', '-1', or '0' denote the proposed method is 'significantly superior', 'significantly inferior', or 'insignificant' to the benchmark method in the row, respectively. It can be observed that on $C_T U_D$, the SR-3DVQA method of the present embodiment is significantly superior to all benchmark schemes except for Liu's scheme. On $C_T C_D$ subset, except for Liu, MSSSIM, and IW-SSIM, the SR-3DVQA method of the present embodiment is significantly superior to all other methods. Liu, MSSSIM, and IW-SSIM may be comparable in evaluating the synthesized videos whose distortions are coming from color videos. In addition, the SR-3DVQA method of the present embodiment has significantly superior performance than all the other methods on the ALL dataset and subset $U_T C_D$. It is because the SR-3DVQA method of the present embodiment is mainly proposed to evaluate the flicker distortion in synthesized video caused by the depth map and it works very well. Overall, the significance test has further validates the superiority of the SR-3DVQA method of the present embodiment in predicting the quality of the synthesized videos.

D. The Impacts of Pooling Methods

The pooling methods of flicker distortion measurement and spatial-temporal activity distortion measurement are analyzed in this subsection. For Equation (20), when (c, d) was set as (1, 0), i.e., the summation pooling, the effects of weight parameter pair ($w_1$, $w_2$) on the performance in quality assessment were explored. ($w_1$, $w_2$) were set as (0.5, 0.5), (0.6, 0.4), (0.8, 0.2), (0.4, 0.6), and (0.2, 0.8). The performance measured by PLCC, SROCC, and RMSE of the five combinations of ($w_1$, $w_2$) is listed in the second to sixth row in the table of FIG. 16. It can be observed that (0.5, 0.5) has better performance than other ($w_1$, $w_2$) pairs in term of PLCC, SROCC and RMSE. For the multiplication pooling, i.e., (c, d) was set as (0, 1), the role of the map function $f(.)$ was analyzed by comparing the performance of six types of $f(.)$, i.e., $f(x)=x$, 'log 10', 'log 2' 'cubic', 'square', 'square root'. The corresponding results are demonstrated in the eighth to fifteen rows in FIG. 16. It is noted that function 'square' excels all the other five functions. But the multiplication pooling is a little inferior to the summation pooling even with different mapping function $f(x)$. Based on the best performance of summation and multiplication pooling, the weight parameters (c, d) in the combination of the two methods had also been investigated. The values of (c, d) were set the same range as ($w_1$, $w_2$). The last five rows in FIG. 16 show the performance. It can be found that when the value of c is equal or greater than d, it achieves the best performance among the five (c, d) combinations. In fact, the best performance is obtained via the summation pooling with ($w_1$, $w_2$) as (0.5, 0.5) or the combination pooling when c is larger than 0.6. Overall, the pooling methods have noticeable impacts on the final performance; the best performance is obtained via the summation pooling with ($w_1$, $w_2$) as (0.5, 0.5) and it is simpler form as compared the combination pooling. Therefore, the summation pooling is employed and ($w_1$, $w_2$) is set as (0.5, 0.5) in the SR-3DVQA method of the present embodiment.

E. Impacts of the Reference Depth Video

The impacts from the reference depth video employed in the SR-3DVQA model of the present embodiment were also investigated. The depth videos employed can be the original depth video or the synthesized depth video at the virtual viewpoint. The advantage of using the original depth video is it has better picture quality as compared with using the synthesized depth video. However, the disadvantage is the original depth video at the virtual viewpoint may not available. Using the synthesized depth video may be more practical in some applications.

A comparative experiment was conducted to analyze the influence from different reference depth videos used in the method of the present embodiment. Since sequence "Lovebirds" and "Newspaper" do not have corresponding original depth video at the virtual viewpoint, all the rest eight sequences in the database were used for comparison. Similarly, the testing database is also categorized as four datasets, $U_T C_D$, $C_T U_D$, $C_T C_D$, and ALL dataset. The PLCC, SROCC, RMSE results are demonstrated in FIG. 17. To distinguish these reduced datasets from those in Section III subsection B, they are marked with "*". The left three columns are the results from the synthesized depth video. As shown in FIG. 17, the values of most PLCC, SROCC and RMSE on the test datasets are a little better than the results of using the original depth video. Basically, they are comparable. It indicates that although the original depth video has more precise depth values, the synthesized depth video, which are generated through DIBR from two original depth videos, is comparable or a little better in the synthesized video quality prediction. Moreover, using the synthesized depth video is more practical. The main reason is the depth video is used to help locate the flicker area by using edge detection and dilation. The original depth video has more precise depth values but may have geometrical misalignment with the synthesized texture video. Therefore, the synthesized depth video may be better to be used for both practical usage and better performance.

IV. Exemplary System

FIG. 18 shows a schematic diagram of an exemplary information handling system 200 that can be used, in single or in multiple, to implement one or more of the above method embodiments in one embodiment of the invention. The information handling system 200 may have different configurations, and it generally includes suitable components necessary to receive, store, and execute appropriate computer instructions, commands, or codes. The main components of the information handling system 200 are a processor 202 and a memory unit 204. The processor 202 may be formed by one or more CPU, MCU, controllers, logic circuits, Raspberry Pi chip, etc. The memory unit 204 may include one or more volatile memory unit (such as RAM, DRAM, SRAM), one or more non-volatile unit (such as ROM, PROM, EPROM, EEPROM, FRAM, MRAM, FLASH, SSD, NAND, and NVDIMM), or any of their combinations. Preferably, the information handling system 200 further includes one or more input devices 206 such as a keyboard, a mouse, a stylus, an image scanner, a microphone, a tactile input device (e.g., touch sensitive screen), and an image/video input device (e.g., camera). The information handling system 200 may further include one or more output devices 208 such as one or more displays (e.g., monitor), speakers, disk drives, headphones, earphones, printers, 3D printers, etc. The display may include a LCD display, a LED/OLED display, or any other suitable display that may or may not be touch sensitive. The information handling system 200 may further include one or more disk drives 212 which may encompass solid state drives, hard disk drives, optical drives, flash drives, and/or magnetic tape drives. A suitable operating system may be installed in the information handling system 200, e.g., on the disk drive 212 or in the memory unit 204. The memory unit 204 and the disk drive 212 may be operated by the processor 202. The information handling system 200 also preferably includes a communication device 210 for establishing one or more communication links (not shown) with one or more other computing devices such as servers, personal computers, terminals, tablets, phones, or other wireless or handheld computing devices. The communication device 210 may be a modem, a Network Interface Card (NIC), an integrated network interface, a radio frequency transceiver, an optical port, an infrared port, a USB connection, or other wired or wireless communication interfaces. The communication links may be wired or wireless for communicating commands, instructions, information and/or data. Preferably, the processor 202, the memory unit 204, and optionally the input devices 206, the output devices 208, the communication device 210 and the disk drives 212 are connected with each other through a bus, a Peripheral Component Interconnect (PCI) such as PCI Express, a Universal Serial Bus (USB), an optical bus, or other like bus structure. In one embodiment, some of these components may be connected through a network such as the Internet or a cloud computing network. A person skilled in the art would appreciate that the information handling system 200 shown in FIG. 18 is merely exemplary and different information handling systems 200 with different configurations may be applicable to implement the method of the present invention.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system" and "computing device" are used, these terms are intended to include any appropriate arrangement of computer or information processing hardware capable of implementing the function described.

The expression "original video" used in this disclosure may refer to 1) Captured video: The source captured video without compression distortion; 2) Captured video at virtual viewpoint: The captured source video at the virtual viewpoint and without compression/rendering distortion; and 3) Captured video at real viewpoint: The source captured video at the real viewpoints. The system and method of the invention is not limited to the use of such "original video", but any "reference video" that is a video, preferably coloured, either the source or with some compression distortion, and either at the real views or the virtual views. In the experiment validation presented above, the reference video is selected as the captured source colour video at the virtual viewpoint of synthesized videos, i.e., the original video at virtual viewpoint, for illustration purpose only. Generally, the reference video is input to video quality predictor. And the predictor is to predict the quality of the synthesized video with respect to the reference video, which can be either the source captured video without distortion or with some compression distortions.

V. REMARKS

The above embodiments of the invention have provided a new video quality assessment metric for 3D synthesized videos, which can be based on three major components: spatio-temporal distortion measurement, flicker distortion measurement, and pooling algorithm. The pooling algorithm may integrate the spatio-temporal distortion and flicker distortion (and their measurements) of the synthesized video to assess the quality of synthesized video. Measurement of flicker distortion includes considering the geometrical distortion and temporal flickering artifacts from color and depth video distortions. The flicker distortion measurement may include 5 main stages, namely: Temporal Layer Conversion, Gradient Feature Extraction, Depth Image based Flicker Distortion Area Detection, Sparse Representation for Flicker Distortion Features, and Weighted Pooling for Temporal Layers. The synthesized video can be regarded as 3D volumetric data with the spatial, temporal and time dimensions (X, Y, T). Then Temporal Layer Conversion can be used to extract X-T or Y-T planes for temporal flickering detection. The synthesized video data (XYT) can be decomposed as multiple XT or YT planes. The Gradient Feature Extraction and Depth Image based Flicker Distortion Area Detection detect candidate flickering regions and/or flickering features in the synthesized videos in XT or YT planes. The gradient feature of the depth map may be used as the feature to locate the flickering regions. Sparse representation can be adopted to represent the flickering features in 3D synthesized videos, in which the amplitude and phase information can be jointly used to X-T or Y-T planes. The sparse representation can be 3D sparse representation, which is more complex, or 2D sparse representation (to X-T or Y-T planes to capture the temporal flickering features in synthesized video), which is less complex hence more computationally efficient. Amplitude and phase information the learned 2D sparse representation can be used to represent the temporal flickering features. A weighted function can be used for balancing amplitude and phase information to improve effectiveness. An integration algorithm can be applied to combine each block of the temporal layers. A weighted pooling algorithm integrates scores from each temporal layer, in which the importance of each temporal layer can be measured and considered. The number of edge patches can be used to rank the importance (which affects the weighting) of each temporal layer. For color reference video, the real captured videos at the synthesized view can be used as reference for visual quality prediction. In addition, the real captured videos of neighboring views can be used as reference if the real captured videos at the synthesized view are unavailable. When using the neighboring views, a rendering process is required to project the neighboring views to the synthesized view. For depth reference video, either the synthesized view or neighboring views can be used as reference input.

Some of the embodiments of the invention which determine perceptual quality of synthesized videos can be used for perceptual video coding, transmission, video pre- and post-processing and video enhancement. Also, some of the embodiments of the invention can be adopted in the advanced 3D video and VR applications, such as three-dimensional TV and Free-view point TV, and six-degree of freedom (6DoF) omnidirectional (360 degree) videos. Some of the embodiments of the invention can be used to measure the quality of 3D synthesized video, which is important and useful in 3D video/image processing, coding, transmission and 3D content production. Compared with existing image/video quality predictors/metrics, the embodiments can achieve more consistency with human vision system and can be more accurate for synthesized videos, e.g., videos in 3D or VR systems. In particular, some embodiments of the invention can predict or determine quality of synthesized videos more accurately than existing methods, especially on the view synthesis distortions induced from compressed depth videos. Some embodiments of the invention can measure quality degradation of synthesized video caused by distortion in color and/or depth videos and the rendering algorithms.

It will be appreciated by persons skilled in the art that numerous variations and/or modifications may be made to the invention as shown in the specific embodiments without departing from the spirit or scope of the invention as broadly described. The described embodiments of the invention should therefore be considered in all respects as illustrative, not restrictive.

The invention claimed is:

1. A computer-implemented method for determining a quality of a synthesized video file, comprising:
processing a reference video file and a synthesized video file associated with the reference video file to compare the reference video file and the synthesized video file, wherein processing comprises:
segmenting the reference video file into a plurality of temporal layers;
segmenting the synthesized video file into a plurality of temporal layers;
processing the temporal layers of the reference video file and the temporal layers of the synthesized video file to identify flicker distortion in the synthesized video file, including processing the temporal layers of the reference video file to determine temporal gradient layers associated with the temporal layers of the reference video file, and processing the temporal layers of the synthesized video file to determine temporal gradient layers associated with the temporal layers of the synthesized video file;
processing a reference depth video file associated with the reference video file to facilitate comparison of the reference video file and the synthesized video file, including
processing the reference depth video file to detect edges of the reference depth video file to generate a depth edge video file, and segmenting the depth edge video file into a plurality of temporal depth layers;
processing the temporal gradient layers of the reference video file based on the temporal depth layers to obtain weighted temporal gradient layers associated with the reference video file;
processing the temporal gradient layers of the synthesized video file based on the temporal depth layers to obtain weighted temporal gradient layers associated with the synthesized video file; and
determining an extent of flicker distortion of the synthesized video file based on the processing, wherein determining comprises:
determining respective extents of flicker distortion for each temporal frame of the synthesized video file, and
determining an overall extent of flicker distortion of the synthesized video file based on the respective extents of flicker distortion.

2. The computer-implemented method of claim 1, wherein determining an extent of flicker distortion of the synthesized video file based on the processing further comprises:
weighting the respective extents of flicker distortion for each temporal frame of the synthesized video file to determine the overall extent of flicker distortion.

3. The computer-implemented method of claim 1, wherein processing the temporal layers of the reference video file and the temporal layers of the synthesized video file further comprises:
filtering the temporal gradient layers of the reference video file to remove gradient features with values below a threshold; and
filtering the temporal gradient layers of the synthesized video file to remove gradient features with values below a threshold.

4. The computer-implemented method of claim 1, wherein processing the reference depth video file further comprises:
processing the temporal depth layers to expand the detected edge width in the temporal depth layers.

5. The computer-implemented method of claim 1, wherein processing the reference video file and the synthesized video file further comprises:
processing the weighted temporal gradient layers associated with the reference video file and the weighted temporal gradient layers associated with the synthesized video file using sparse representation processing techniques to determine flicker distortion in each of the weighted temporal gradient layers of the synthesized video file.

6. The computer-implemented method of claim 1, wherein processing the reference video file and the synthesized video file further comprises:
processing the weighted temporal gradient layers associated with the reference video file and the weighted temporal gradient layers associated with the synthesized video file using sparse representation processing techniques to determine phase distortion and amplitude distortion associated with flicker distortion in each of the weighted temporal gradient layers of the synthesized video file.

7. The computer-implemented method of claim 6, wherein processing the reference video file and the synthesized video file further comprises:
weighting the phase distortion and the amplitude distortion respectively associated with flicker distortion in each of the weighted temporal gradient layers of the synthesized video file.

8. The computer-implemented method of claim 7, further comprising:
determining an extent of spatial-temporal activity distortion of the synthesized video file.

9. The computer-implemented method of claim 8, wherein determining an extent of spatial-temporal activity distortion of the synthesized video file comprises:
determining respective extents of spatial-temporal activity distortion for each temporal frame of the synthesized video file; and
determining an overall extent of spatial-temporal activity distortion of the synthesized video file based on the respective extents of spatial-temporal activity distortion.

10. The computer-implemented method of claim 9, wherein determining an extent of spatial-temporal activity distortion of the synthesized video file further comprises:
weighting the respective extents of spatial-temporal activity distortion for each temporal frame of the synthesized video file to determine the overall extent of spatial-temporal activity distortion.

11. The computer-implemented method of claim 10, further comprising:
determining a quality of the synthesized video file based on the determined extent of flicker distortion and the determined extent of spatial-temporal activity distortion.

12. The computer-implemented method of claim 1, wherein the synthesized video file is a 3D video file containing 3D video data.

13. The computer-implemented method of claim 1, wherein the synthesized video file is a virtual reality video file containing virtual reality video data.

14. A system for determining a quality of a synthesized video file, comprising one or more processors arranged to:
process a reference video file and a synthesized video file associated with the reference video file to compare the reference video file and the synthesized video file, wherein the process includes:
segmenting the reference video file into a plurality of temporal layers;
segmenting the synthesized video file into a plurality of temporal layers;
processing the temporal layers of the reference video file and the temporal layers of the synthesized video file to identify flicker distortion in the synthesized video file, including processing the temporal layers of the reference video file to determine temporal gradient layers associated with the temporal layers of the reference video file, and processing the temporal layers of the synthesized video file to determine temporal gradient layers associated with the temporal layers of the synthesized video file;
processing a reference depth video file associated with the reference video file for facilitating comparison of the reference video file and the synthesized video file, including processing the reference depth video file to detect edges of the reference depth video file to generate a depth edge video file, and segmenting the depth edge video file into a plurality of temporal depth layers;
processing the temporal gradient layers of the reference video file based on the temporal depth layers to obtain weighted temporal gradient layers associated with the reference video file;
processing the temporal gradient layers of the synthesized video file based on the temporal depth layers to obtain weighted temporal gradient layers associated with the synthesized video file; and
determine an extent of flicker distortion of the synthesized video file based on the processing, wherein to determine includes:
determining respective extents of flicker distortion for each temporal frame of the synthesized video file, and
determining an overall extent of flicker distortion of the synthesized video file based on the respective extents of flicker distortion.

15. The system of claim 14, further comprising:
a display operably connected with the one or more processors for displaying the determined extent of flicker distortion.

16. The system of claim 14, wherein the one or more processors are further arranged to:
determine an extent of spatial-temporal activity distortion of the synthesized video file.

17. The system of claim 16, wherein the one or more processors are further arranged to:
determine a quality of the synthesized video file based on the determined extent of flicker distortion and the determined extent of spatial-temporal activity distortion.

18. The system of claim 14, wherein the synthesized video file is a 3D video file containing 3D video data or a virtual reality video file containing virtual reality video data.

19. The system of claim 14, wherein the one or more processors are further arranged to process the reference video file and the synthesized video file by:
processing the weighted temporal gradient layers associated with the reference video file and the weighted temporal gradient layers associated with the synthesized video file using sparse representation processing techniques to determine flicker distortion in each of the weighted temporal gradient layers of the synthesized video file.

20. The system of claim 14, wherein the one or more processors are further arranged to process the reference video file and the synthesized video file by:
processing the weighted temporal gradient layers associated with the reference video file and the weighted temporal gradient layers associated with the synthesized video file using sparse representation processing techniques to determine phase distortion and amplitude distortion associated with flicker distortion in each of the weighted temporal gradient layers of the synthesized video file.

21. The system of claim 20, wherein the one or more processors are further arranged to process the reference video file and the synthesized video file by:
weighting the phase distortion and the amplitude distortion respectively associated with flicker distortion in each of the weighted temporal gradient layers of the synthesized video file.

22. The system of claim 16, wherein the one or more processors are further arranged to determine an extent of spatial-temporal activity distortion of the synthesized video file by:
determining respective extents of spatial-temporal activity distortion for each temporal frame of the synthesized video file; and
determining an overall extent of spatial-temporal activity distortion of the synthesized video file based on the respective extents of spatial-temporal activity distortion.

23. The system of claim 17, wherein the one or more processors are further arranged to determine an extent of spatial-temporal activity distortion of the synthesized video file further comprises:
weighting the respective extents of spatial-temporal activity distortion for each temporal frame of the synthesized video file to determine the overall extent of spatial-temporal activity distortion.

24. A non-transitory computer readable medium storing computer instructions that, when executed by one or more processors, causes the one or more processors to perform a method for determining a quality of a synthesized video file, the method comprising:
processing a reference video file and a synthesized video file associated with the reference video file to compare the reference video file and the synthesized video file, the processing comprising:
segmenting the reference video file into a plurality of temporal layers;
segmenting the synthesized video file into a plurality of temporal layers;
processing the temporal layers of the reference video file and the temporal layers of the synthesized video file to identify flicker distortion in the synthesized video file, including processing the temporal layers of the reference video file to determine temporal gradient layers associated with the temporal layers of the reference video file, and processing the temporal layers of the synthesized video file to determine temporal gradient layers associated with the temporal layers of the synthesized video file;
processing a reference depth video file associated with the reference video file to facilitate comparison of the reference video file and the synthesized video file, including processing the reference depth video file to detect edges of the reference depth video file to generate a depth edge video file, and segmenting the depth edge video file into a plurality of temporal depth layers;

processing the temporal gradient layers of the reference video file based on the temporal depth layers to obtain weighted temporal gradient layers associated with the reference video file;

processing the temporal gradient layers of the synthesized video file based on the temporal depth layers to obtain weighted temporal gradient layers associated with the synthesized video file; and determining an extent of flicker distortion of the synthesized video file based on the processing, the determining comprising:
  determining respective extents of flicker distortion for each temporal frame of the synthesized video file, and
  determining an overall extent of flicker distortion of the synthesized video file based on the respective extents of flicker distortion.

* * * * *